US 9,442,516 B2

(12) United States Patent
Migos et al.

(10) Patent No.: US 9,442,516 B2
(45) Date of Patent: Sep. 13, 2016

(54) DEVICE, METHOD, AND GRAPHICAL USER INTERFACE FOR NAVIGATING THROUGH AN ELECTRONIC DOCUMENT

(75) Inventors: Charles J. Migos, San Bruno, CA (US); Jay Christopher Capela, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 736 days.

(21) Appl. No.: 13/077,850

(22) Filed: Mar. 31, 2011

(65) Prior Publication Data

US 2012/0192101 A1 Jul. 26, 2012

Related U.S. Application Data

(60) Provisional application No. 61/435,781, filed on Jan. 24, 2011.

(51) Int. Cl.
*G06F 3/0481* (2013.01)
*G06F 1/16* (2006.01)
(Continued)

(52) U.S. Cl.
CPC ........... *G06F 1/1626* (2013.01); *G06F 3/0481* (2013.01); *G06F 3/0483* (2013.01); *G06F 3/04883* (2013.01); *G06F 17/241* (2013.01); *G06F 2200/1637* (2013.01); *G06F 2203/04803* (2013.01)

(58) Field of Classification Search
CPC .. G06F 3/048; G06F 3/0483; G06F 3/04815; G06F 3/04812; G06F 3/0481
USPC ................................. 715/767, 861, 776, 851
See application file for complete search history.

(56) References Cited

U.S. PATENT DOCUMENTS 6,166,736 A 12/2000 Hugh
6,230,170 B1 5/2001 Zellweger et al.
(Continued)

FOREIGN PATENT DOCUMENTS

EP 2109031 A2 10/2009
EP 2 151 745 A2 2/2010
(Continued)

OTHER PUBLICATIONS

Apple, iPhone User's Guide, Jun. 2007, Apple Inc., 137 pages.
(Continued)

*Primary Examiner* — Steven Sax
*Assistant Examiner* — Le Nguyen
(74) *Attorney, Agent, or Firm* — Morrison & Foerster LLP

(57) ABSTRACT

An electronic device with a display and a touch-sensitive surface stores a document having primary content, supplementary content, and user-generated content. The device displays a representation of the document in a segmented user interface on the display. Primary content of the document is displayed in a first segment of the segmented user interface and supplementary content of the document is concurrently displayed in a second segment of the segmented user interface distinct from the first segment. The device receives a request to view user-generated content of the document. In response to the request, the device maintains display of the previously displayed primary content, ceases to display at least a portion of the previously displayed supplementary content, and displays user-generated content of the document in a third segment of the segmented user interface distinct from the first segment and the second segment.

51 Claims, 36 Drawing Sheets

(51) Int. Cl.
*G06F 3/0483* (2013.01)
*G06F 3/0488* (2013.01)
*G06F 17/24* (2006.01)

(56) References Cited

U.S. PATENT DOCUMENTS

| | | |
|---|---|---|
| 6,486,895 B1 | 11/2002 | Robertson et al. |
| 7,185,274 B1 | 2/2007 | Rubin et al. |
| 7,458,014 B1 | 11/2008 | Rubin et al. |
| 7,739,622 B2 | 6/2010 | Deline et al. |
| 7,814,112 B2 | 10/2010 | Gupta et al. |
| 7,954,056 B2 | 5/2011 | Graham |
| 8,196,061 B1 | 6/2012 | Bhojan |
| 8,250,071 B1 | 8/2012 | Killalea et al. |
| 8,290,777 B1 | 10/2012 | Nguyen et al. |
| 8,443,280 B2 | 5/2013 | Noyes |
| 8,499,236 B1 | 7/2013 | Keljo |
| 8,566,700 B2 | 10/2013 | Ueda |
| 8,656,040 B1 | 2/2014 | Bajaj et al. |
| 8,762,844 B2 | 6/2014 | Kim et al. |
| 2002/0010707 A1* | 1/2002 | Chang et al. ............ 707/500 |
| 2002/0075334 A1 | 6/2002 | Yfantis |
| 2002/0083101 A1 | 6/2002 | Card et al. |
| 2002/0113802 A1 | 8/2002 | Card et al. |
| 2002/0118230 A1* | 8/2002 | Card et al. ............ 345/776 |
| 2002/0120651 A1 | 8/2002 | Pustejovsky et al. |
| 2003/0030673 A1 | 2/2003 | Ho |
| 2003/0076352 A1 | 4/2003 | Uhlig et al. |
| 2003/0184598 A1 | 10/2003 | Graham |
| 2004/0017404 A1* | 1/2004 | Schileru-Key ............ 345/854 |
| 2004/0080531 A1* | 4/2004 | Berstis ............ 345/738 |
| 2004/0125081 A1 | 7/2004 | Hayakawa |
| 2004/0141016 A1 | 7/2004 | Fukatsu et al. |
| 2004/0205514 A1 | 10/2004 | Sommerer et al. |
| 2005/0132281 A1 | 6/2005 | Pan et al. |
| 2005/0132291 A1 | 6/2005 | Wagner et al. |
| 2005/0223068 A1* | 10/2005 | Shohfi et al. ............ 709/206 |
| 2006/0101122 A1 | 5/2006 | Ishii |
| 2006/0150215 A1* | 7/2006 | Wroblewski ............ 725/47 |
| 2006/0164399 A1 | 7/2006 | Cheston et al. |
| 2006/0230346 A1 | 10/2006 | Bhogal et al. |
| 2006/0242607 A1 | 10/2006 | Hudson |
| 2007/0083828 A1 | 4/2007 | Toriyama et al. |
| 2007/0174761 A1 | 7/2007 | Lin et al. |
| 2007/0233736 A1 | 10/2007 | Xiong et al. |
| 2007/0239831 A1 | 10/2007 | Basu |
| 2007/0277121 A1 | 11/2007 | Beckman |
| 2008/0082920 A1 | 4/2008 | Eom |
| 2008/0134033 A1 | 6/2008 | Burns et al. |
| 2008/0141182 A1 | 6/2008 | Barsness et al. |
| 2008/0168073 A1* | 7/2008 | Siegel et al. ............ 707/100 |
| 2008/0259057 A1 | 10/2008 | Brons |
| 2008/0319944 A1 | 12/2008 | Venolia et al. |
| 2009/0058820 A1 | 3/2009 | Hinckley |
| 2009/0089712 A1* | 4/2009 | Sato ............ 715/838 |
| 2009/0103780 A1 | 4/2009 | Nishihara et al. |
| 2009/0113347 A1 | 4/2009 | Hess et al. |
| 2009/0132957 A1 | 5/2009 | Reddy |
| 2009/0174679 A1 | 7/2009 | Westerman |
| 2009/0187825 A1 | 7/2009 | Sandquist et al. |
| 2009/0228126 A1 | 9/2009 | Spielberg et al. |
| 2009/0228842 A1 | 9/2009 | Westerman et al. |
| 2009/0235155 A1 | 9/2009 | Ueda |
| 2009/0235162 A1 | 9/2009 | Nuccio et al. |
| 2009/0241054 A1* | 9/2009 | Hendricks ............ 715/776 |
| 2009/0244020 A1 | 10/2009 | Sjolin |
| 2009/0247233 A1 | 10/2009 | Kim |
| 2009/0254867 A1* | 10/2009 | Farouki et al. ............ 715/853 |
| 2009/0258677 A1 | 10/2009 | Ellis et al. |
| 2009/0259939 A1 | 10/2009 | Lockett et al. |
| 2009/0271381 A1 | 10/2009 | Beezer et al. |
| 2009/0315841 A1 | 12/2009 | Cheng et al. |
| 2009/0319888 A1* | 12/2009 | Oygard ............ 715/252 |
| 2010/0023878 A1 | 1/2010 | Douris et al. |
| 2010/0023883 A1 | 1/2010 | Khazaka et al. |
| 2010/0044121 A1* | 2/2010 | Simon et al. ............ 178/18.03 |
| 2010/0045616 A1 | 2/2010 | Li et al. |
| 2010/0058212 A1 | 3/2010 | Belitz et al. |
| 2010/0066763 A1 | 3/2010 | Macdougall et al. |
| 2010/0070613 A1 | 3/2010 | Chen et al. |
| 2010/0088641 A1 | 4/2010 | Choi |
| 2010/0105408 A1 | 4/2010 | Palmer et al. |
| 2010/0107078 A1 | 4/2010 | Hayashi |
| 2010/0141590 A1 | 6/2010 | Markiewicz et al. |
| 2010/0174606 A1 | 7/2010 | Hoyle |
| 2010/0175018 A1 | 7/2010 | Petschnigg et al. |
| 2010/0185949 A1 | 7/2010 | Jaeger |
| 2010/0242066 A1 | 9/2010 | Tseng |
| 2010/0259493 A1 | 10/2010 | Chang et al. |
| 2010/0259562 A1 | 10/2010 | Miyazawa et al. |
| 2010/0283743 A1 | 11/2010 | Coddington |
| 2010/0289756 A1 | 11/2010 | Anzures et al. |
| 2010/0293498 A1 | 11/2010 | Maxfield |
| 2010/0295781 A1 | 11/2010 | Alameh et al. |
| 2010/0315359 A1 | 12/2010 | Seong et al. |
| 2010/0333045 A1 | 12/2010 | Gueziec et al. |
| 2011/0041056 A1 | 2/2011 | Griffin et al. |
| 2011/0074824 A1 | 3/2011 | Srinivasan et al. |
| 2011/0087955 A1 | 4/2011 | Ho et al. |
| 2011/0091182 A1 | 4/2011 | Look et al. |
| 2011/0107241 A1 | 5/2011 | Moore |
| 2011/0145691 A1 | 6/2011 | Noyes |
| 2011/0145692 A1 | 6/2011 | Noyes et al. |
| 2011/0191710 A1* | 8/2011 | Jang et al. ............ 715/776 |
| 2011/0209099 A1 | 8/2011 | Hinckley et al. |
| 2011/0209104 A1 | 8/2011 | Hinckley et al. |
| 2011/0227810 A1* | 9/2011 | McKinney et al. ............ 345/1.3 |
| 2011/0252062 A1* | 10/2011 | Hanatani et al. ............ 707/772 |
| 2011/0261030 A1 | 10/2011 | Bullock |
| 2011/0295879 A1 | 12/2011 | Logis et al. |
| 2011/0296344 A1 | 12/2011 | Habib et al. |
| 2012/0023438 A1* | 1/2012 | Xia et al. ............ 715/783 |
| 2012/0023462 A1* | 1/2012 | Rosing et al. ............ 715/863 |
| 2012/0084644 A1* | 4/2012 | Robert et al. ............ 715/255 |
| 2012/0096344 A1 | 4/2012 | Ho et al. |
| 2012/0096345 A1 | 4/2012 | Ho et al. |
| 2012/0102387 A1 | 4/2012 | Badoiu et al. |
| 2012/0121185 A1 | 5/2012 | Zavesky |
| 2012/0131470 A1 | 5/2012 | Wessling et al. |
| 2012/0159373 A1 | 6/2012 | Archer et al. |
| 2012/0166950 A1 | 6/2012 | Frumar et al. |
| 2012/0179970 A1 | 7/2012 | Hayes |
| 2012/0192068 A1 | 7/2012 | Migos et al. |
| 2012/0240085 A1* | 9/2012 | Sim et al. ............ 715/864 |
| 2012/0274550 A1 | 11/2012 | Campbell et al. |

FOREIGN PATENT DOCUMENTS

| | | |
|---|---|---|
| JP | 6-110881 A | 4/1994 |
| JP | 7-325700 A | 12/1995 |
| JP | 10-240488 A | 9/1998 |
| JP | 2000-40158 A | 2/2000 |
| JP | 2003 195998 | 7/2003 |
| JP | 2003-526820 A | 9/2003 |
| JP | 2005-045744 A | 2/2005 |
| JP | 2005-244301 A | 9/2005 |
| JP | 2007-279638 A | 10/2007 |
| JP | 2008-276801 A | 11/2008 |
| JP | 2009-080710 A | 4/2009 |
| JP | 2010-097353 A | 4/2010 |
| JP | 2010-511939 A | 4/2010 |
| JP | 2010-522935 A | 7/2010 |
| WO | 2007/002621 A2 | 1/2007 |
| WO | 2007/089766 A2 | 8/2007 |
| WO | 2008/067498 A2 | 6/2008 |
| WO | 2008/090902 A1 | 7/2008 |
| WO | 2010/018579 A2 | 2/2010 |
| WO | 2010/134729 A2 | 11/2010 |
| WO | 2012/103117 A1 | 8/2012 |

OTHER PUBLICATIONS

Wolfe, J., "Annotation technologies: A software and research review," Computers and Composition, vol. 19, No. 4, Oct. 5, 2002, pp. 471-497.

(56) References Cited

OTHER PUBLICATIONS

Invitation to Pay Additional Fees dated May 4, 2012, received in International Application No. PCT/US2012/022401, which corresponds to U.S. Appl. No. 13/077,850, 8 pages (Migos).
International Search Report and Written Opinion dated Jul. 6, 2012, received in International Patent Application No. PCT/US2012/022401, which corresponds to U.S. Appl. No. 13/077,850, 17 pages (Migos).
Office Action dated Jul. 20, 2012, received in U.S. Appl. No. 13/077,867, 10 pages (Migos).
Office Action dated Dec. 21, 2012, received in U.S. Appl. No. 13/077,867, 9 pages (Migos).
Non-Final Office Action received for U.S. Appl. No. 13/077,874, mailed on Dec. 3, 2015, 23 pages.
Australian Examination Report received for Australian Patent Application No. 2012209199, mailed on Dec. 17, 2015, 3 pages.
Office Action received for Chinese Patent Application No. 201280006317.5, mailed on Jan. 11, 2016, 10 pages. (5 pages of English Translation).
Final Office Action received for U.S. Appl. No. 13/077,855, mailed on Mar. 24, 2016, 19 pages.
Ajidev, "iAnnotate", available at <http://www.ajidev.com/iannotate/>, retrieved on Nov. 22, 2010, 2 pages.
Ajidev, "Welcome to iAnnotate V 1.3!", available at <www.ajidev.com>, 2010, 37 pages.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Find eBook Readers, "PDF on the iPad—iAnnotate Review—Annotations", available at <http://findebookreaders.com/blog/2010/05/pdf-on-the-ipad- iannotate-review-annotations/>, May 2010, 9 pages.
Goodiware, "GoodReader User Manual: Viewing PDF Files", available at <http://www.goodreader.net/gr-man-view-pdf.html#annots>, 2010, 11 pages.
Lee et al., "SmartNote for iPad: User Guide, Version 1.4", available at <http://mysmartnote.net>, 2010, 17 pages.
Mobipocket, "Mobipocket Reader Desktop 6.2", available at <http://www.mobipocket.com/en/downloadsoft/productdetailsreader.asp>, 2010, 3 pages.
Readdle Inc., "PDF Expert for iPad: User's Guide", 2010, 15 pages.
Vimeo, "Smart Design Magazine UX Concept", available at <http://vimeo.com/10813230>, 2010, 2 pages.
Notice of Allowance received for Korean Patent Application No. 10-2013-7022057, mailed on Apr. 27, 2015, 2 pages.
Office Action received for Korean Patent Application No. 10-2013-7022057, mailed on May 28, 2014, 7 pages (3 pages of English Translation).
Office Action received for Korean Patent Application No. 10-2014-7033660, mailed on Feb. 23, 2015, 3 pages.
Office Action received for Korean Patent Application No. 10-2015-7013849, mailed on Aug. 20, 2015, 5 pages (2 pages of English Translation).
Final Office Action Received for U.S. Appl. No. 13/077,855, mailed on Mar. 17, 2014, 11 pages.
Final Office Action Received for U.S. Appl. No. 13/077,855, mailed on Nov. 7, 2013, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Final Office Action Received for U.S. Appl. No. 13/077,862, mailed on Nov. 8, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Mar. 15, 2013, 10 pages.
Final Office Action Received for U.S. Appl. No. 13/077,867, mailed on May 23, 2013, 10 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Final Office Action received for U.S. Appl. No. 13/077,874, mailed on Dec. 3, 2014, 23 pages.
Non-Final Office Action received for U.S. Appl. No. 13/077,874, mailed on Jun. 19, 2014, 15 pages.
Office Action received for Australian Patent Application No. 2012209199, issued on Jan. 15, 2015, 3 pages.
Office Action received for Japanese Patent Application No. 2013-550664, mailed on Sep. 12, 2014, 10 pages (6 pages of English Translation).
International Preliminary Report on Patentability received for PCT Patent Application No. PCT/US2012/022401, mailed on Jul. 30, 2013, 11 pages.
Notice of Allowance received for Korean Patent Application No. 10-2014-7033660, issued on Sep. 25, 2015, 3 pages (1 page of English Translation).
Office Action received for Japanese Patent Application No. 2013-550664, mailed on Aug. 24, 2015, 9 pages (4 pages of English Translation).
Final Office Action received for U.S. Appl. No. 13/077,862, mailed on Oct. 22, 2015, 16 pages.
Notice of Acceptance received for Australian Patent Application No. 2012209199, mailed on Jan. 27, 2016, 3 pages.
Advisory Action received for U.S. Appl. No. 13/077,862, mailed on Apr. 7, 2016, 3 pages.
Notice of Allowance received for Korean Patent Application No. 10-2015-7013849, mailed on Mar. 28, 2016, 3 pages (1 page of English Translation).
Office Action received for Japanese Patent Application No. 2013-550664, mailed on Jun. 10, 2016, 3 pages (See Communication under 37 CFR § 1.98(a) (3)).

* cited by examiner

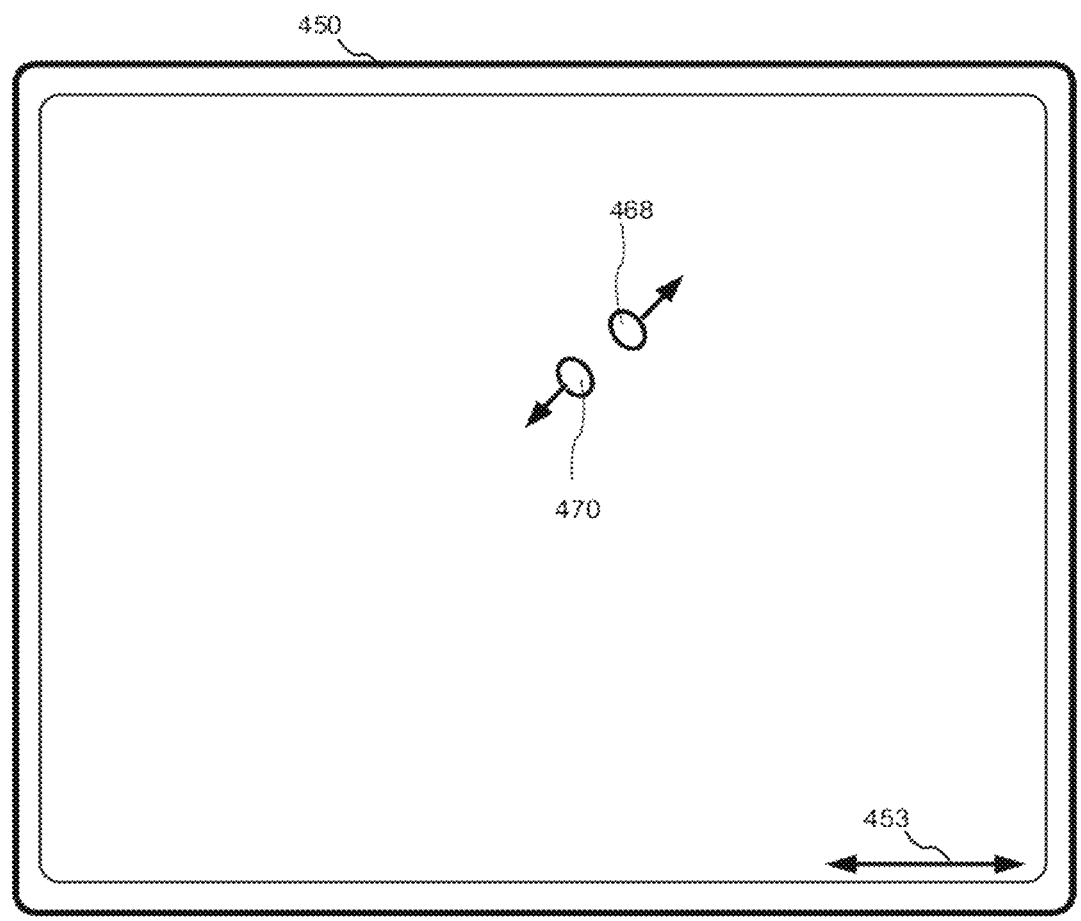
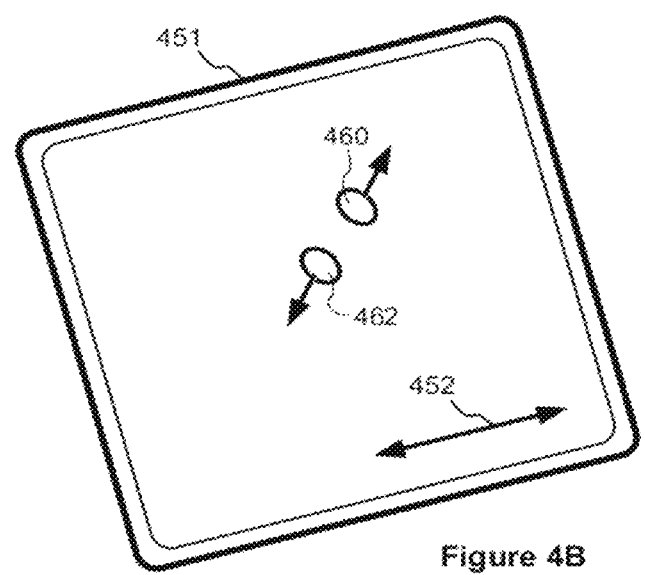
Figure 4B

Lesson Objectives

1. Distinguish between sensory and motor divisions of the nervous system.

2. Describe the structure of the eye and identify the roles of rods and cones.

3. Describe the structure of the ear and identify structures involved in hearing and balance.

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

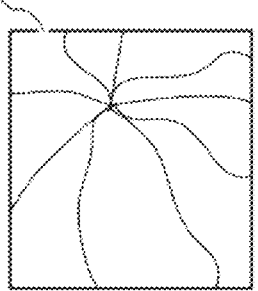

*Figure 1:* This animation illustrates a nerve pulse traveling from the cell body to the synapse via the axon.

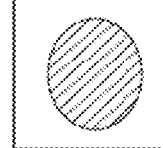

*Figure 2:* The brain controls the nervous system.

Page 3

Figure 5D

Multifunction Device 100

Lesson Objectives
1. Distinguish between sensory and motor divisions of the nervous system.

2. Describe the structure of the eye and identify the roles of rods and cones.

3. Describe the structure of the ear and identify structures involved in hearing and balance.

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Regions of the Brain

*Figure 1:* This animation illustrates a ...

*Figure 2:* The brain control...

Touch Screen 112

Figure 5F

Multifunction Device 100

516-5

3. Describe the structure of the ear and identify structures involved in hearing and balance.

The nervous system is a complex network of nervous tissue that sends electrical and chemical signals. The nervous systems include the central nervous system (CNS) and the peripheral nervous system (PNS) together.

506-1

508-1

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

*Figure 1:* This animation illustrates a ...

*Figure 2:* The brain control...

Regions of the Brain

The brain is the most complex organ in the body. The gallery in Figure 3 gives you a good overview. It contains about one hundred billion neurons each of which can be connected to tens of thousands of other

*Figure 3:* Explore the components...

Touch Screen 112

Figure 5H

Multifunction Device 100

Lesson Objectives
1. Distinguish between sensory and motor divisions of the nervous system.

2. Describe the structure of the eye and identify the roles of rods and cones.

3. Describe the structure of the ear and identify structures involved in hearing and balance.

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

*Figure 1:* This animation illustrates a ...

*Figure 2:* The brain control...

Touch Screen 112

Lesson Objectives
1. Distinguish between sensory and motor divisions of the nervous system.

2. Describe the structure of the eye and identify the roles of rods and cones.

3. Describe the structure of the ear and identify structures involved in hearing and balance.

The nervous system is a complex network of nervous tissue that sends electrical and chemical signals. include the centr and the peripher together.

2.3 Peripheral Nervous System

*Figure 1:* This animation illustrates a ...

*Figure 2:* The brain control...

Central Nerv

The central nerv represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Figure 5N

Multifunction Device 100

Lesson Objectives
1. Distinguish between sensory and motor divisions of the nervous system.

2. Describe the structure of the eye and identify the roles of rods and cones.

3. Describe the structure of the ear and identify structures involved in hearing and balance.

The nervous system is a complex network of nervous tissue that sends electrical and chemical signals. The nervous systems include the central nervous system (CNS) and the peripheral nervous system (PNS) together

Section 2.3
Peripheral Nervous System
"The report is due ..."

Centr

*Figure 1:* This animation illustrates a ...

*Figure 2:* The brain control...

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Touch Screen 112

702 — Store a document having primary content and supplementary content

704 — Display content of the document in a first display mode of a document presentation application. The supplementary content is visually integrated with the primary content in the first display mode.

706 — Visually integrating the supplementary content with the primary content in the first display mode includes displaying the supplementary content inline with the primary content

708 — A plurality of items of supplementary content are concurrently displayed in the first display mode

710 — The first display mode is a creator-specified display mode in which the primary content and supplementary content are arranged in accordance with a template specified by a creator of the document

712 — Receive a request to display content of the document in a second display mode of the document presentation application

714 — Receiving the request to display content of the document in the second display mode includes detecting rotation of the device

716 — The second display mode is a text-review display mode in which two or more portions of text in the primary content that are displayed as distinct blocks of text in a creator-specified display mode are displayed in a same contiguous block of text

718 — The first display mode and the second display mode are both display modes for use by an end user to view the document on the device

Figure 7A

In response to the request, display content of the document in the second display mode, with representations of the supplementary content visually segregated from the primary content in the second display mode. ⟋ 720

> Visually segregating the representations of the supplementary content from the primary content in the second display mode includes: displaying the primary content in a first region of a user interface that does not include the supplementary content, and displaying the representations of the supplementary content in a second region of the user interface that is distinct from the first region of the user interface and that does not include the primary content. ⟋ 722

> An item of supplementary content is displayed at a first size on the display in the first display mode, and a representation of the item of supplementary content is displayed in the second display mode. The representation of the item of supplementary content has a second size on the display that is smaller than the first size. ⟋ 724

> In the first display mode, the supplementary content includes one or more items of supplementary content. In the second display mode: display one or more supplementary content icons that replace corresponding items of supplementary content displayed in the first display mode, detect selection of a respective supplementary content icon, and in response to detecting the selection, display a corresponding item of supplementary content on the display. ⟋ 726

> The first display mode has a first content advancement direction with respect to a reading direction of text in the primary content, and the second display mode has a second content advancement direction with respect to the reading direction of the text in the primary content that is distinct from the first content advancement direction. ⟋ 728

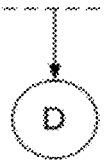

Figure 7B

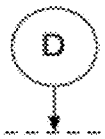

```
┌──────────────────────────────────────────────────────────────┐
│  The primary content includes a plurality of page boundaries. Detect a   │
│           request to navigate through the document.                      │──730
│  In response to detecting the request to navigate through the document:  │
│         in accordance with a determination that the device is in the first│
│  display mode, navigate to a sequentially adjacent page in accordance with│
│                         the page boundaries; and,                         │
│         in accordance with a determination that the device is in the second│
│  display mode, scroll through the document in accordance with a magnitude │
│                  of a value associated with the request.                  │
└──────────────────────────────────────────────────────────────┘

┌──────────────────────────────────────────────────────────────┐
│  A respective item of supplementary content is associated with a predefined│
│       portion of the primary content. The respective item of supplementary│──732
│  content is displayed proximate to the predefined portion of primary content│
│   in the first display mode. A representation of the respective item of   │
│  supplementary content is displayed proximate to the predefined portion of│
│           primary content in the second display mode.                    │
│   ┌────────────────────────────────────────────────────────┐ │
│   │ While displaying the predefined portion of the primary content and the│ │
│   │ representation of the respective item of supplementary content in the │─734
│   │                       second display mode:                            │ │
│   │      detect a request to navigate through the primary content; and    │ │
│   │  in response to detecting the request to navigate through the primary │ │
│   │  content: reposition the predefined portion of the primary content to an│ │
│   │      updated location on the display in accordance with the request to│ │
│   │           navigate through the primary content; and reposition the   │ │
│   │  representation of the respective item of supplementary content on the│ │
│   │       display in accordance with the updated location of the predefined│ │
│   │                   portion of the primary content.                     │ │
│   └────────────────────────────────────────────────────────┘ │
└──────────────────────────────────────────────────────────────┘

┌──────────────────────────────────────────────────────────────┐
│  The device has a long axis and a short axis. In the first display mode, a│──736
│    reading direction of the text is aligned with the long axis. In the second│
│  display mode, the reading direction of the text is aligned with the short axis.│
└──────────────────────────────────────────────────────────────┘
```

802 Store a document having a plurality of features having respective locations within the document. The plurality of features includes features of a first feature type in a first sequence and features of a second feature type in a second sequence. The second feature type is distinct from the first feature type.

804 The first feature type is a page or a page break

806 The second feature type is one of: a section, a section break, a chapter, a chapter break or an annotation

808 Display at least a portion of the document on the display

810 Detect a first gesture on the touch-sensitive surface

812 The first gesture is a swipe gesture

814 In response to detecting the first gesture:

816 In accordance with a determination that the first gesture is a single contact gesture, navigate to a portion of the document that includes or is located proximate to a sequentially adjacent feature of the first feature type in the document

818 In accordance with a determination that the first gesture is a multi-contact gesture with a first predefined number of contacts, navigate to a portion of the document that includes or is located proximate to a sequentially adjacent feature of the second feature type in the document

820 The multi-contact gesture is a two contact swipe gesture and the second type of feature is a section break

822 The multi-contact gesture is a two contact swipe gesture and the second type of feature is a chapter break

824 The multi-contact gesture is a three contact swipe gesture and the second type of feature is an annotation

826 The first gesture has a direction. In accordance with a determination that the direction of the gesture includes a component in a first direction, the sequentially adjacent feature is an immediately subsequent feature. In accordance with a determination that the direction of the gesture includes a component in a second direction that is opposite to the first direction, the sequentially adjacent feature is an immediately preceding feature.

DEVICE, METHOD, AND GRAPHICAL USER INTERFACE FOR NAVIGATING THROUGH AN ELECTRONIC DOCUMENT

RELATED APPLICATIONS

This application claims priority to U.S. Provisional Application Ser. No. 61/435,781, filed Jan. 24, 2011, entitled "Device, Method, and Graphical User Interface for Navigating through an Electronic Document," which is incorporated by reference herein in its entirety.

This application is related to the following: (1) U.S. application Ser. No. 13/077,855, filed Mar. 31, 2011, entitled "Device, Method, and Graphical User Interface for Navigating through an Electronic Document,"; (2) U.S. application Ser. No. 13/077,862, filed Mar. 31, 2011, entitled "Device, Method, and Graphical User Interface for Navigating through an Electronic Document,"; (3) U.S. application Ser. No. 13/077,867, filed Mar. 31, 2011, entitled "Device, Method, and Graphical User Interface for Navigating through an Electronic Document,"; and (4) U.S. application Ser. No. 13/077,874, filed Mar. 31, 2011, entitled "Device, Method, and Graphical User Interface for Navigating through an Electronic Document,"; which are incorporated by reference herein in their entirety.

TECHNICAL FIELD

This relates generally to electronic devices with touch-sensitive surfaces, including but not limited to electronic devices with touch-sensitive surfaces that display electronic documents.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate electronic documents on a display.

For electronic devices with touch-sensitive surfaces, existing methods for navigating through electronic documents are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for navigating through an electronic document. Such methods and interfaces may complement or replace conventional methods for navigating through an electronic document. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes storing a document having primary content, supplementary content, and user-generated content. The method also includes displaying a representation of the document in a segmented user interface on the display. The primary content of the document is displayed in a first segment of the segmented user interface, and the supplementary content of the document is concurrently displayed in a second segment of the segmented user interface distinct from the first segment. The method includes receiving a request to view user-generated content of the document. The method furthermore includes, in response to the request: maintaining display of the previously displayed primary content, ceasing to display at least a portion of the previously displayed supplementary content, and displaying user-generated content of the document in a third segment of the segmented user interface distinct from the first segment and the second segment.

In accordance with some embodiments, an electronic device includes a display, a touch-sensitive surface, one or more processors, memory, and one or more programs. The one or more programs are stored in the memory and configured to be executed by the one or more processors. The one or more programs include instructions for storing a document having primary content, supplementary content, and user-generated content. The one or more programs also include instructions for displaying a representation of the document in a segmented user interface on the display. The primary content of the document is displayed in a first segment of the segmented user interface, and the supplementary content of the document is concurrently displayed in a second segment of the segmented user interface distinct from the first segment. The one or more programs include instructions for receiving a request to view user-generated content of the document. The one or more programs furthermore include instructions for, in response to the request: maintaining display of the previously displayed primary content, ceasing to display at least a portion of the previously displayed supplementary content, and displaying user-generated content of the document in a third segment of the segmented user interface distinct from the first segment and the second segment.

In accordance with some embodiments, a computer readable storage medium has stored therein instructions, which, when executed by an electronic device with a display and a touch-sensitive surface, cause the device to store a document having primary content, supplementary content, and user-generated content. The instructions also cause the device to display a representation of the document in a segmented user interface on the display. The primary content of the document is displayed in a first segment of the segmented user interface, and the supplementary content of the document is concurrently displayed in a second segment of the segmented user interface distinct from the first segment. The instructions cause the device to receive a request to view user-generated content of the document. The instructions furthermore cause the device to, in response to the request: maintain display of the previously displayed primary content, cease to display at least a portion of the previously displayed supplementary content, and display user-generated content of the document in a third segment of the segmented user interface distinct from the first segment and the second segment.

In accordance with some embodiments, a graphical user interface on an electronic device with a display, a touch-sensitive surface, a memory, and one or more processors to execute one or more programs stored in the memory includes a representation of a document in a segmented user interface. The document has primary content, supplementary content, and user-generated content. The primary content of the document is displayed in a first segment of the segmented user interface, and the supplementary content of the document is concurrently displayed in a second segment of the segmented user interface distinct from the first segment. In response to receiving a request to view user-generated content of the document, display of the previously displayed primary content is maintained, at least a portion of the previously displayed supplementary content ceases to be displayed, and user-generated content of the document is displayed in a third segment of the segmented user interface distinct from the first segment and the second segment.

In accordance with some embodiments, an electronic device includes: a display; a touch-sensitive surface; and means for storing a document having primary content, supplementary content, and user-generated content. The electronic device also includes means for displaying a representation of the document in a segmented user interface on the display. The primary content of the document is displayed in a first segment of the segmented user interface, and the supplementary content of the document is concurrently displayed in a second segment of the segmented user interface distinct from the first segment. The electronic device includes means for receiving a request to view user-generated content of the document. The electronic device furthermore includes means, enabled in response to the request, including: means for maintaining display of the previously displayed primary content, means for ceasing to display at least a portion of the previously displayed supplementary content, and means for displaying user-generated content of the document in a third segment of the segmented user interface distinct from the first segment and the second segment.

In accordance with some embodiments, an information processing apparatus for use in an electronic device with a display and a touch-sensitive surface includes means for storing a document having primary content, supplementary content, and user-generated content. The information processing apparatus also includes means for displaying a representation of the document in a segmented user interface on the display. The primary content of the document is displayed in a first segment of the segmented user interface, and the supplementary content of the document is concurrently displayed in a second segment of the segmented user interface distinct from the first segment. The information processing apparatus includes means for receiving a request to view user-generated content of the document. The information processing apparatus furthermore includes means, enabled in response to the request, including: means for maintaining display of the previously displayed primary content, means for ceasing to display at least a portion of the previously displayed supplementary content, and means for displaying user-generated content of the document in a third segment of the segmented user interface distinct from the first segment and the second segment.

In accordance with some embodiments, a method is performed at an electronic device with a display and a touch-sensitive surface. The method includes storing a document having primary content and supplementary content, and displaying content of the document in a first display mode of a document presentation application. The supplementary content is visually integrated with the primary content in the first display mode. The method also includes: while displaying content of the document in the first display mode, receiving a request to display content of the document in a second display mode of the document presentation application, and in response to the request, displaying content of the document in the second display mode. The representations of the supplementary content are visually segregated from the primary content in the second display mode.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: storing a document having primary content and supplementary content, and displaying content of the document in a first display mode of a document presentation application. The supplementary content is visually integrated with the primary content in the first display mode. The one or more programs also include instructions for: while displaying content of the document in the first display mode, receiving a request to display content of the document in a second display mode of the document presentation application, and in response to the request, displaying content of the document in the second display mode. The representations of the supplementary content are visually segregated from the primary content in the second display mode.

In accordance with some embodiments, a computer readable storage medium has stored therein instructions, which, when executed by an electronic device with a display and a touch-sensitive surface, cause the device to: store a document having primary content and supplementary content, and display content of the document in a first display mode of a document presentation application. The supplementary content is visually integrated with the primary content in the first display mode. The instructions also cause the device to: while displaying content of the document in the first display mode, receive a request to display content of the document in a second display mode of the document presentation application; and in response to the request, display content of the document in the second display mode. The representations of the supplementary content are visually segregated from the primary content in the second display mode.

In accordance with some embodiments, a graphical user interface on an electronic device with a display, a touch-sensitive surface, a memory, and one or more processors to execute one or more programs stored in the memory includes content of a document in a first display mode of a document presentation application. The document has primary content and supplementary content, and the supplementary content is visually integrated with the primary content in the first display mode. While displaying content of the document in the first display mode, in response to receiving a request to display content of the document in a second display mode of the document presentation application, content of the document is displayed in the second display mode. The representations of the supplementary content are visually segregated from the primary content in the second display mode.

In accordance with some embodiments, an electronic device includes: a display; a touch-sensitive surface; means for storing a document having primary content and supplementary content; and means for displaying content of the document in a first display mode of a document presentation application. The supplementary content is visually integrated with the primary content in the first display mode. The electronic device also includes: means, enabled while displaying content of the document in the first display mode, for receiving a request to display content of the document in a second display mode of the document presentation application; and means, enabled in response to the request, for displaying content of the document in the second display mode. The representations of the supplementary content are visually segregated from the primary content in the second display mode.

In accordance with some embodiments, an information processing apparatus for use in an electronic device with a display and a touch-sensitive surface includes: means for storing a document having primary content and supplementary content; and means for displaying content of the document in a first display mode of a document presentation application. The supplementary content is visually integrated with the primary content in the first display mode. The information processing apparatus also includes: means, enabled while displaying content of the document in the first display mode, for receiving a request to display content of the document in a second display mode of the document presentation application, and means, enabled in response to the request, for displaying content of the document in the second display mode. The representations of the supplementary content are visually segregated from the primary content in the second display mode.

In accordance with some embodiments, a method is performed at an electronic device with a display and a touch-sensitive surface. The method includes storing a document having a plurality of features having respective locations within the document. The plurality of features includes features of a first feature type in a first sequence and features of a second feature type in a second sequence. The second feature type is distinct from the first feature type. The method also includes: displaying at least a portion of the document on the display; and detecting a first gesture on the touch-sensitive surface. The method includes, in response to detecting the first gesture: in accordance with a determination that the first gesture is a single contact gesture, navigating to a portion of the document that includes or is located proximate to a sequentially adjacent feature of the first feature type in the document; and in accordance with a determination that the first gesture is a multi-contact gesture with a first predefined number of contacts, navigating to a portion of the document that includes or is located proximate to a sequentially adjacent feature of the second feature type in the document.

In accordance with some embodiments, an electronic device includes a display, a touch-sensitive surface, one or more processors, memory, and one or more programs. The one or more programs are stored in the memory and configured to be executed by the one or more processors. The one or more programs include instructions for storing a document having a plurality of features having respective locations within the document. The plurality of features includes features of a first feature type in a first sequence and features of a second feature type in a second sequence. The second feature type is distinct from the first feature type. The one or more programs also include instructions for: displaying at least a portion of the document on the display; and detecting a first gesture on the touch-sensitive surface. The one or more programs include instructions for, in response to detecting the first gesture: in accordance with a determination that the first gesture is a single contact gesture, navigating to a portion of the document that includes or is located proximate to a sequentially adjacent feature of the first feature type in the document; and in accordance with a determination that the first gesture is a multi-contact gesture with a first predefined number of contacts, navigating to a portion of the document that includes or is located proximate to a sequentially adjacent feature of the second feature type in the document.

In accordance with some embodiments, a computer readable storage medium has stored therein instructions, which, when executed by an electronic device with a display and a touch-sensitive surface, cause the device to store a document having a plurality of features having respective locations within the document. The plurality of features includes features of a first feature type in a first sequence and features of a second feature type in a second sequence. The second feature type is distinct from the first feature type. The instructions also cause the device to: display at least a portion of the document on the display; and detect a first gesture on the touch-sensitive surface. The instructions cause the device to, in response to detecting the first gesture: in accordance with a determination that the first gesture is a single contact gesture, navigate to a portion of the document that includes or is located proximate to a sequentially adjacent feature of the first feature type in the document; and in accordance with a determination that the first gesture is a multi-contact gesture with a first predefined number of contacts, navigate to a portion of the document that includes or is located proximate to a sequentially adjacent feature of the second feature type in the document.

In accordance with some embodiments, a graphical user interface on an electronic device with a display, a touch-sensitive surface, a memory, and one or more processors to execute one or more programs stored in the memory includes display of at least a portion of a document. The document has a plurality of features having respective locations within the document, and the plurality of features includes features of a first feature type in a first sequence and features of a second feature type in a second sequence. The second feature type is distinct from the first feature type. In response to detecting a first gesture on the touch-sensitive surface: in accordance with a determination that the first gesture is a single contact gesture, the document is navigated to a portion of the document that includes or is located proximate to a sequentially adjacent feature of the first feature type in the document; and in accordance with a determination that the first gesture is a multi-contact gesture with a first predefined number of contacts, the document is navigated to a portion of the document that includes or is located proximate to a sequentially adjacent feature of the second feature type in the document.

In accordance with some embodiments, an electronic device includes: a display; a touch-sensitive surface; means for storing a document having a plurality of features having respective locations within the document. The plurality of features includes features of a first feature type in a first sequence and features of a second feature type in a second sequence. The second feature type is distinct from the first feature type. The electronic device also includes: means for displaying at least a portion of the document on the display; and means for detecting a first gesture on the touch-sensitive surface. The electronic device includes means, enabled in response to detecting the first gesture, including: means, enabled in accordance with a determination that the first gesture is a single contact gesture, for navigating to a portion of the document that includes or is located proximate to a sequentially adjacent feature of the first feature type in the document; and means, enabled in accordance with a determination that the first gesture is a multi-contact gesture with a first predefined number of contacts, for navigating to a portion of the document that includes or is located proximate to a sequentially adjacent feature of the second feature type in the document.

In accordance with some embodiments, an information processing apparatus for use in an electronic device with a display and a touch-sensitive surface includes means for storing a document having a plurality of features having respective locations within the document. The plurality of features includes features of a first feature type in a first sequence and features of a second feature type in a second sequence. The second feature type is distinct from the first feature type. The information processing apparatus also includes: means for displaying at least a portion of the document on the display; and means for detecting a first gesture on the touch-sensitive surface. The information processing apparatus includes means, enabled in response to detecting the first gesture, including: means, enabled in accordance with a determination that the first gesture is a single contact gesture, for navigating to a portion of the document that includes or is located proximate to a sequentially adjacent feature of the first feature type in the document; and means, enabled in accordance with a determination that the first gesture is a multi-contact gesture with a first predefined number of contacts, for navigating to a portion of the document that includes or is located proximate to a sequentially adjacent feature of the second feature type in the document.

In accordance with some embodiments, a method is performed at an electronic device with a display and a touch-sensitive surface. The method includes displaying a portion of a multi-segment document. A first set of segments of the multi-segment document each have one or more respective annotations, and a second set of segments of the multi-segment document do not have annotations. The method also include: detecting a predefined gesture on the touch-sensitive surface; and in response to detecting the predefined gesture, displaying an array of segment representations that includes only representations of segments in the first set of segments. A plurality of respective segment representations in the array of segment representations each include a visual indication of a respective annotation associated with the respective segment for the respective segment representation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for displaying a portion of a multi-segment document. A first set of segments of the multi-segment document each have one or more respective annotations, and a second set of segments of the multi-segment document do not have annotations. The one or more programs also include instructions for: detecting a predefined gesture on the touch-sensitive surface; and in response to detecting the predefined gesture, displaying an array of segment representations that includes only representations of segments in the first set of segments. A plurality of respective segment representations in the array of segment representations each include a visual indication of a respective annotation associated with the respective segment for the respective segment representation.

In accordance with some embodiments, a computer readable storage medium has stored therein instructions, which, when executed by an electronic device with a display and a touch-sensitive surface, cause the device to display a portion of a multi-segment document. A first set of segments of the multi-segment document each have one or more respective annotations, and a second set of segments of the multi-segment document do not have annotations. The instructions also cause the device to: detect a predefined gesture on the touch-sensitive surface; and in response to detecting the predefined gesture, display an array of segment representations that includes only representations of segments in the first set of segments. A plurality of respective segment representations in the array of segment representations each include a visual indication of a respective annotation associated with the respective segment for the respective segment representation.

In accordance with some embodiments, a graphical user interface on an electronic device with a display, a touch-sensitive surface, a memory, and one or more processors to execute one or more programs stored in the memory includes a portion of a multi-segment document. A first set of segments of the multi-segment document each have one or more respective annotations, and a second set of segments of the multi-segment document do not have annotations. In response to detecting a predefined gesture on the touch-sensitive surface, an array of segment representations that includes only representations of segments in the first set of segments is displayed. A plurality of respective segment representations in the array of segment representations each include a visual indication of a respective annotation associated with the respective segment for the respective segment representation.

In accordance with some embodiments, an electronic device includes: a display; a touch-sensitive surface; and means for displaying a portion of a multi-segment document. A first set of segments of the multi-segment document each have one or more respective annotations, and a second set of segments of the multi-segment document do not have annotations. The electronic device also includes: means for detecting a predefined gesture on the touch-sensitive surface; and means, enabled in response to detecting the predefined gesture, for displaying an array of segment representations that includes only representations of segments in the first set of segments. A plurality of respective segment representations in the array of segment representations each include a visual indication of a respective annotation associated with the respective segment for the respective segment representation.

In accordance with some embodiments, an information processing apparatus for use in an electronic device with a display and a touch-sensitive surface includes means for displaying a portion of a multi-segment document. A first set of segments of the multi-segment document each have one or more respective annotations, and a second set of segments of the multi-segment document do not have annotations. The information processing apparatus also includes: means for detecting a predefined gesture on the touch-sensitive surface; and means, enabled in response to detecting the predefined gesture, for displaying an array of segment representations that includes only representations of segments in the first set of segments. A plurality of respective segment representations in the array of segment representations each include a visual indication of a respective annotation associated with the respective segment for the respective segment representation.

In accordance with some embodiments, a method is performed at an electronic device with a display and a touch-sensitive surface. The method includes: concurrently displaying a first portion of a document and a navigation bar for navigating through the document; and detecting a gesture at a location on the touch-sensitive surface that corresponds to a portion of the navigation bar associated with a second portion of the document. The second portion of the document includes a respective annotation. The method also includes, in response to detecting the gesture, while continuing to display the first portion of the document, displaying, at a location proximate to the portion of the navigation bar, a representation of the second portion of the document that includes a representation of the respective annotation.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: concurrently displaying a first portion of a document and a navigation bar for navigating through the document; and detecting a gesture at a location on the touch-sensitive surface that corresponds to a portion of the navigation bar associated with a second portion of the document. The second portion of the document includes a respective annotation. The one or more programs also include instructions for, in response to detecting the gesture, while continuing to display the first portion of the document, displaying, at a location proximate to the portion of the navigation bar, a representation of the second portion of the document that includes a representation of the respective annotation.

In accordance with some embodiments, a computer readable storage medium has stored therein instructions, which, when executed by an electronic device with a display and a touch-sensitive surface, cause the device to: concurrently display a first portion of a document and a navigation bar for navigating through the document; and detect a gesture at a location on the touch-sensitive surface that corresponds to a portion of the navigation bar associated with a second portion of the document. The second portion of the document includes a respective annotation. The instructions also cause the device to, in response to detecting the gesture, while continuing to display the first portion of the document, display, at a location proximate to the portion of the navigation bar, a representation of the second portion of the document that includes a representation of the respective annotation.

In accordance with some embodiments, a graphical user interface on an electronic device with a display, a touch-sensitive surface, a memory, and one or more processors to execute one or more programs stored in the memory includes concurrent display of: a first portion of a document and a navigation bar for navigating through the document. In response to detecting a gesture at a location on the touch-sensitive surface that corresponds to a portion of the navigation bar associated with a second portion of the document (the second portion of the document includes a respective annotation), a representation of the second portion of the document that includes a representation of the respective annotation is displayed while continuing to display the first portion of the document, at a location proximate to the portion of the navigation bar.

In accordance with some embodiments, an electronic device includes: a display; a touch-sensitive surface; means for concurrently displaying a first portion of a document and a navigation bar for navigating through the document; and means for detecting a gesture at a location on the touch-sensitive surface that corresponds to a portion of the navigation bar associated with a second portion of the document. The second portion of the document includes a respective annotation. The electronic device includes means, enabled in response to detecting the gesture, while continuing to display the first portion of the document, for displaying, at a location proximate to the portion of the navigation bar, a representation of the second portion of the document that includes a representation of the respective annotation.

In accordance with some embodiments, an information processing apparatus for use in an electronic device with a display and a touch-sensitive surface includes: means for concurrently displaying a first portion of a document and a navigation bar for navigating through the document; and means for detecting a gesture at a location on the touch-sensitive surface that corresponds to a portion of the navigation bar associated with a second portion of the document. The second portion of the document includes a respective annotation. The information processing apparatus also includes means, enabled in response to detecting the gesture, while continuing to display the first portion of the document, for displaying, at a location proximate to the portion of the navigation bar, a representation of the second portion of the document that includes a representation of the respective annotation.

In accordance with some embodiments, an electronic device includes a storage unit configured to store a document having primary content, supplementary content, and user-generated content; and a display unit configured to display a representation of the document in a segmented user interface. The primary content of the document is displayed in a first segment of the segmented user interface and the supplementary content of the document is concurrently displayed in a second segment of the segmented user interface distinct from the first segment. The electronic device also includes a touch-sensitive surface unit configured to receive a request to view user-generated content of the document; and a processing unit coupled to the storage unit, the display unit, and the touch-sensitive surface unit. The processing unit is configured to, in response to the request: maintain display of the previously displayed primary content on the display unit; cease to display at least a portion of the previously displayed supplementary content on the display unit; and enable display of user-generated content of the document in a third segment of the segmented user interface distinct from the first segment and the second segment on the display unit.

In accordance with some embodiments, an electronic device includes a storage unit configured to store a document having primary content and supplementary content; and a display unit configured to display content of the document in a first display mode of a document presentation application. The supplementary content is visually integrated with the primary content in the first display mode. The electronic device also includes a touch-sensitive surface unit configured to receive user input; and a processing unit coupled to the storage unit, the display unit, and the touch-sensitive surface unit. The processing unit is configured to: while the display unit displays content of the document in the first display mode, receive a request to display content of the document in a second display mode of the document presentation application; and, in response to the request, enable display of content of the document in the second display mode on the display unit. The representations of the supplementary content are visually segregated from the primary content in the second display mode.

In accordance with some embodiments, an electronic device includes a storage unit configured to store a document having a plurality of features having respective locations within the document. The plurality of features includes features of a first feature type in a first sequence and features of a second feature type in a second sequence. The second feature type is distinct from the first feature type. The electronic device also includes a display unit configured to display at least a portion of the document; a touch-sensitive surface unit configured to detect a first gesture; and a processing unit coupled to the storage unit, the display unit, and the touch-sensitive surface unit. The processing unit is configured to, in response to detecting the first gesture: in accordance with a determination that the first gesture is a single contact gesture, navigate to a portion of the document that includes or is located proximate to a sequentially adjacent feature of the first feature type in the document; and in accordance with a determination that the first gesture is a multi-contact gesture with a first predefined number of contacts, navigate to a portion of the document that includes or is located proximate to a sequentially adjacent feature of the second feature type in the document.

In accordance with some embodiments, an electronic device includes a display unit configured to display a portion of a multi-segment document. A first set of segments of the multi-segment document each have one or more respective annotations and a second set of segments of the multi-segment document do not have annotations. The electronic device also includes a touch-sensitive surface unit configured to detect a predefined gesture; and a processing unit coupled to the display unit and the touch-sensitive surface unit. The processing unit is configured to, in response to detecting the predefined gesture, enable display of an array of segment representations that includes only representations of segments in the first set of segments. A plurality of respective segment representations in the array of segment representations each include a visual indication of a respective annotation associated with the respective segment for the respective segment representation.

In accordance with some embodiments, an electronic device includes a display unit configured to concurrently display a first portion of a document and a navigation bar for navigating through the document; and a touch-sensitive surface unit configured to detect a gesture at a location on the touch-sensitive surface unit that corresponds to a portion of the navigation bar associated with a second portion of the document. The second portion of the document includes a respective annotation. The electronic device also includes a processing unit coupled to the display unit and the touch-sensitive surface unit. The processing unit is configured to, in response to detecting the gesture, while continuing to enable display of the first portion of the document on the display unit, enable display, at a location proximate to the portion of the navigation bar, on the display unit of a representation of the second portion of the document that includes a representation of the respective annotation.

Thus, electronic devices with displays and touch-sensitive surfaces are provided with faster, more efficient methods and interfaces for navigating through an electronic document, thereby increasing the effectiveness, efficiency, and user satisfaction with such devices. Such methods and interfaces may complement or replace conventional methods for navigating through an electronic document.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7C are flow diagrams illustrating a method of displaying primary and supplementary content in an electronic document in visually integrated and visually segregated display modes in accordance with some embodiments.

FIG. 8 is a flow diagram illustrating a method of navigating through an electronic document with single contact and multi-contact gestures in accordance with some embodiments.

DESCRIPTION OF EMBODIMENTS

Figure 1A:
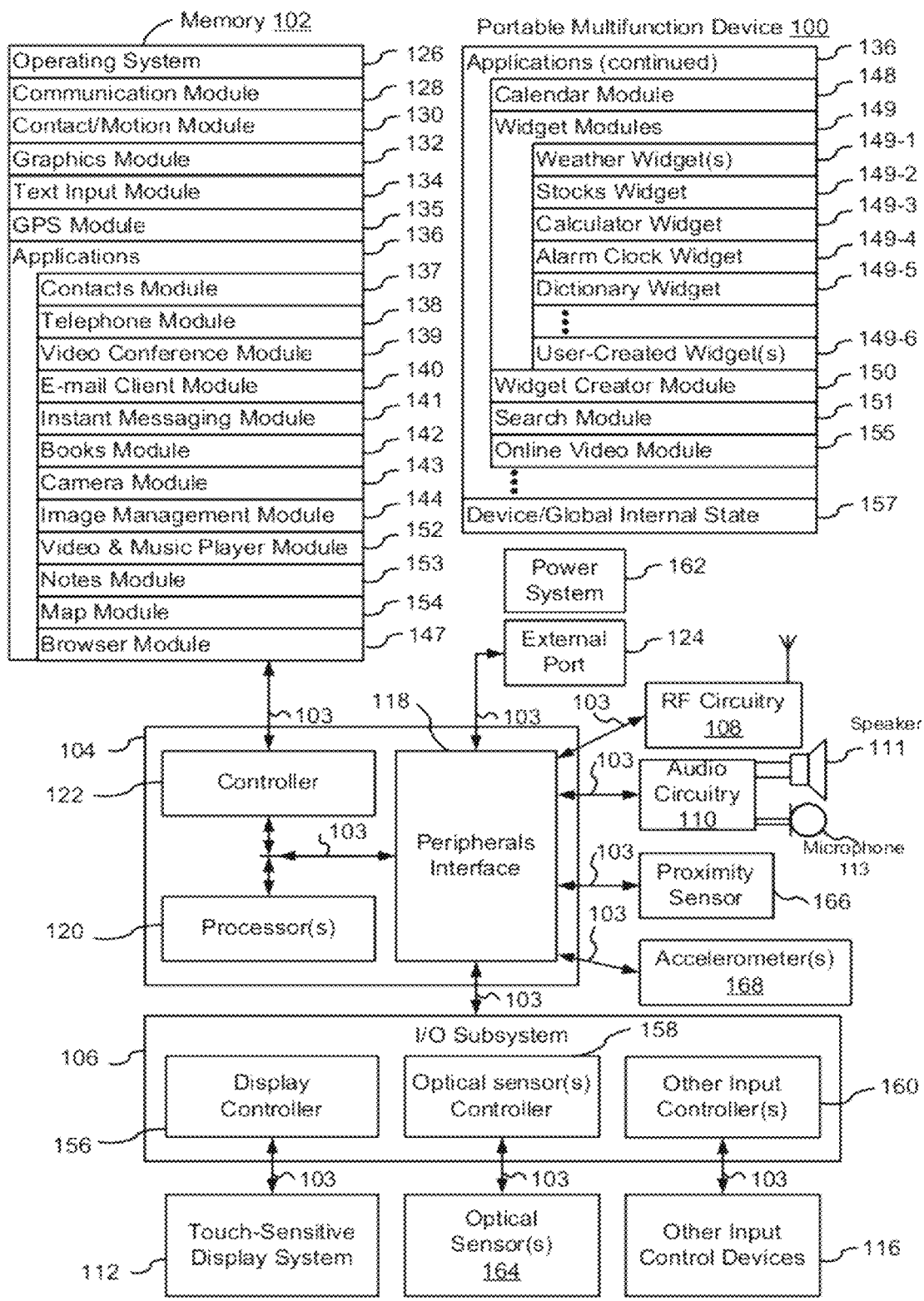
FIG. 1A is a block diagram illustrating a portable multifunction device with a touch-sensitive display in accordance with some embodiments.

Electronic documents, such as digital books, newspapers and magazines, offer the possibility of enhanced reading experiences, beyond what conventional paper-based documents can provide. In addition to primary content (e.g., text), electronic documents may also incorporate supplemental content (e.g., multimedia content such as pictures, figures, movies, slide presentations, animations, HTML 5 widgets, moving photos, etc.) and user-generated content (e.g., user notes, highlighting, and other annotations). But the electronic devices used to view and interact with electronic documents (e.g., tablet computers, smart phones, and other portable devices) often have limited screen areas to display electronic documents. This limited screen area makes it challenging for the user to view the various types of content in electronic documents in an efficient manner. Furthermore, conventional electronic devices offer limited methods of navigating through an electronic document (e.g., scrolling), which is inefficient and wastes energy. The embodiments described below address various problems interacting with electronic documents that have not been recognized and/or properly addressed, such as:

- how to display primary content, supplemental content, and user-generated content to facilitate user interaction;
- how to display content in different device orientations (e.g., portrait versus landscape orientation) to facilitate different types of reading;
- how to quickly and easily navigate an electronic document page-by-page, chapter-by chapter, or annotation-by-annotation;
- how to quickly see just the user-annotated pages in an electronic document; and
- how to quickly find user annotations with a navigation bar.

The embodiments described below address these issues and related issues. The devices and methods described below provide a user-friendly environment that empowers a user to efficiently navigate through and interact with primary, supplemental, and user-generated content in electronic documents.

Below, FIGS. 1A-1B, 2, and 3 provide a description of exemplary devices. FIGS. 4A-4B and 5A-5P illustrate exemplary user interfaces for navigating through, and displaying various content of, an electronic document. FIGS. 6A-6C, 7A-7C, and 8-10 are flow diagrams illustrating methods of navigating through an electronic document. The user interfaces in FIGS. 5A-5P are used to illustrate the processes in FIGS. 6A-6C, 7A-7C, and 8-10. FIGS. 11-15 illustrate electronic devices for performing the methods described in FIGS. 6A-6C, 7A-7C, and 8-10.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
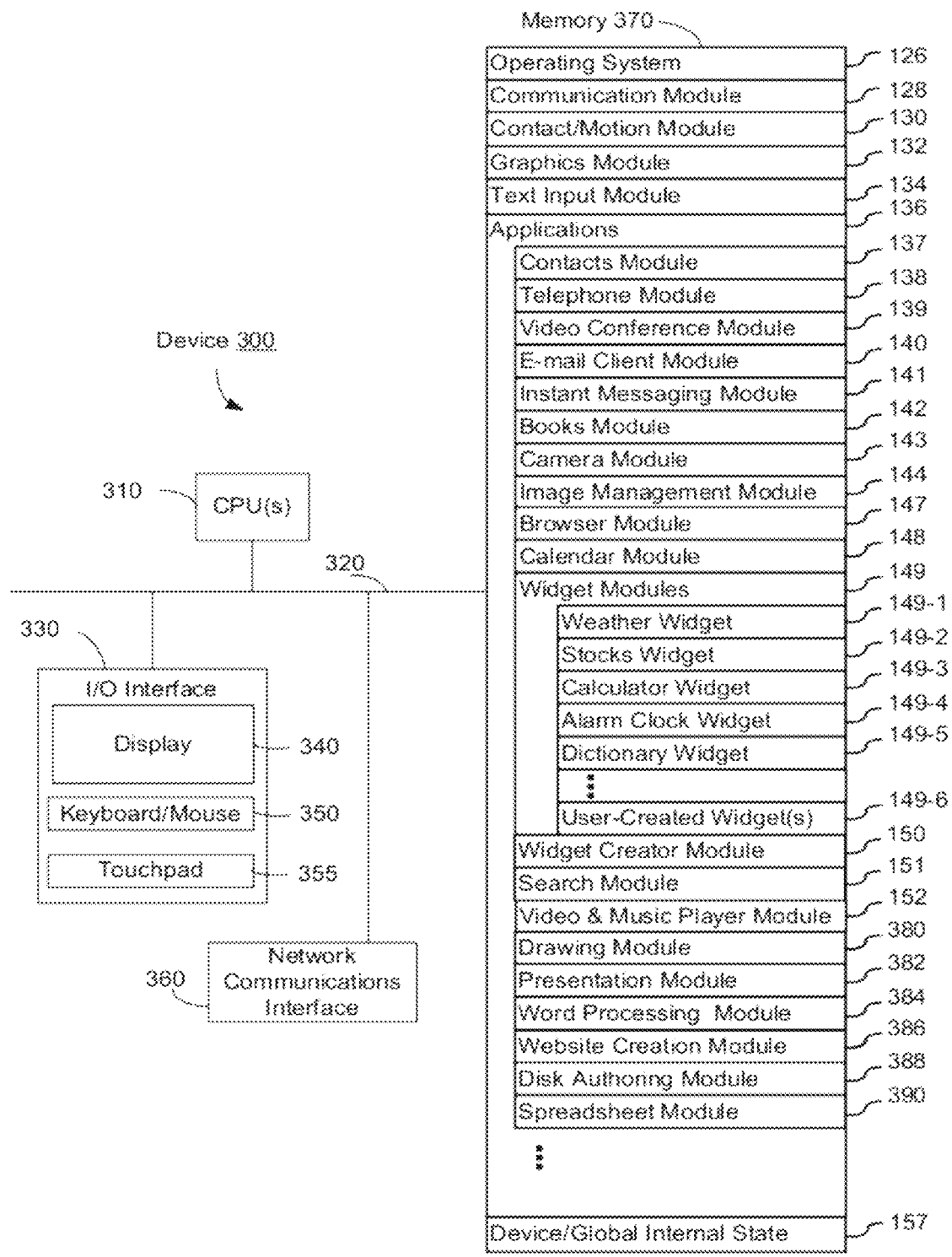
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 books module 142;
 camera module 143 for still and/or video images;
 image management module 144;
 browser module 147;
 calendar module 148;
 widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which may be made up of a video player module and a music player module;
 notes module 153;
 map module 154; and/or
 online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
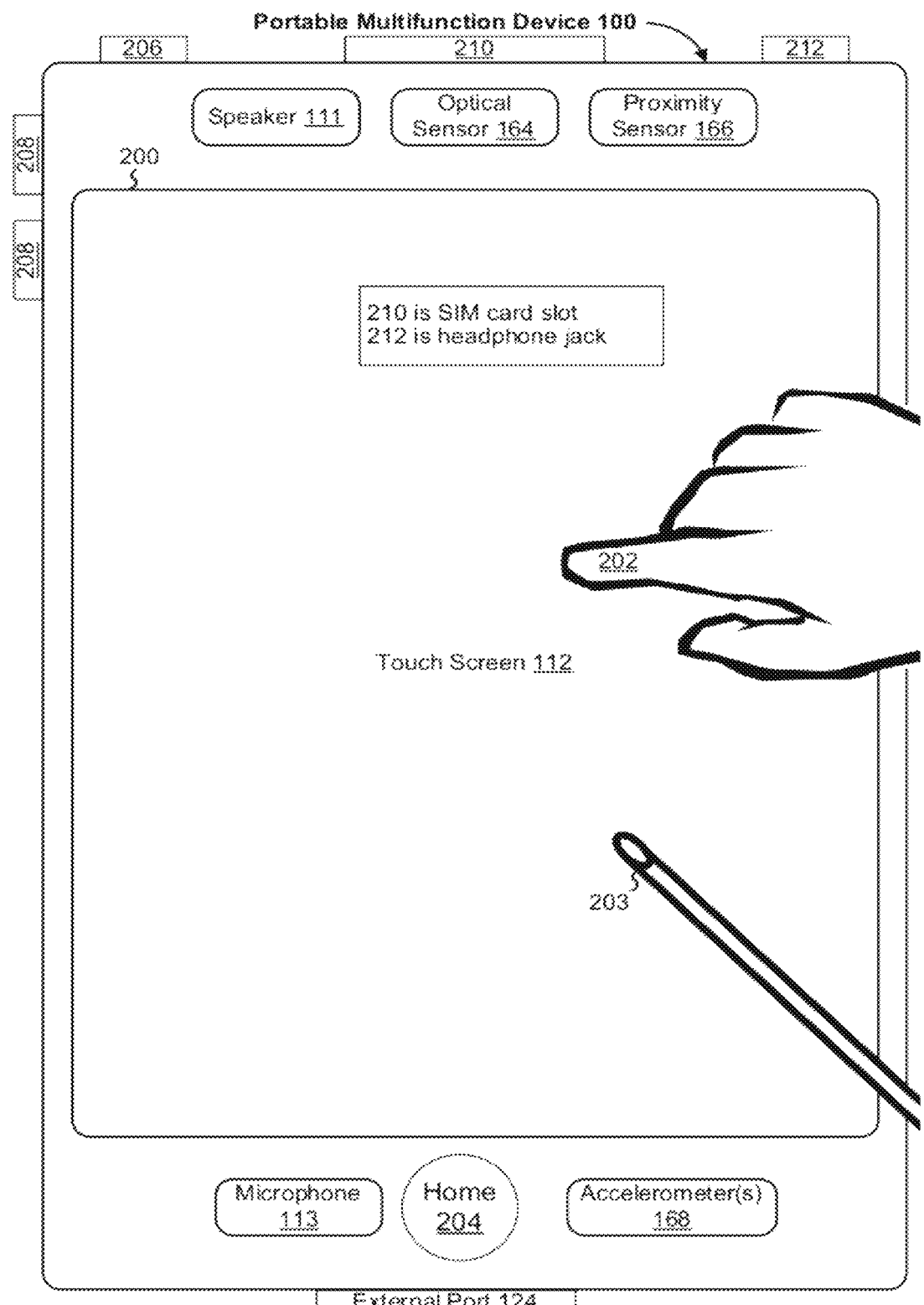
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
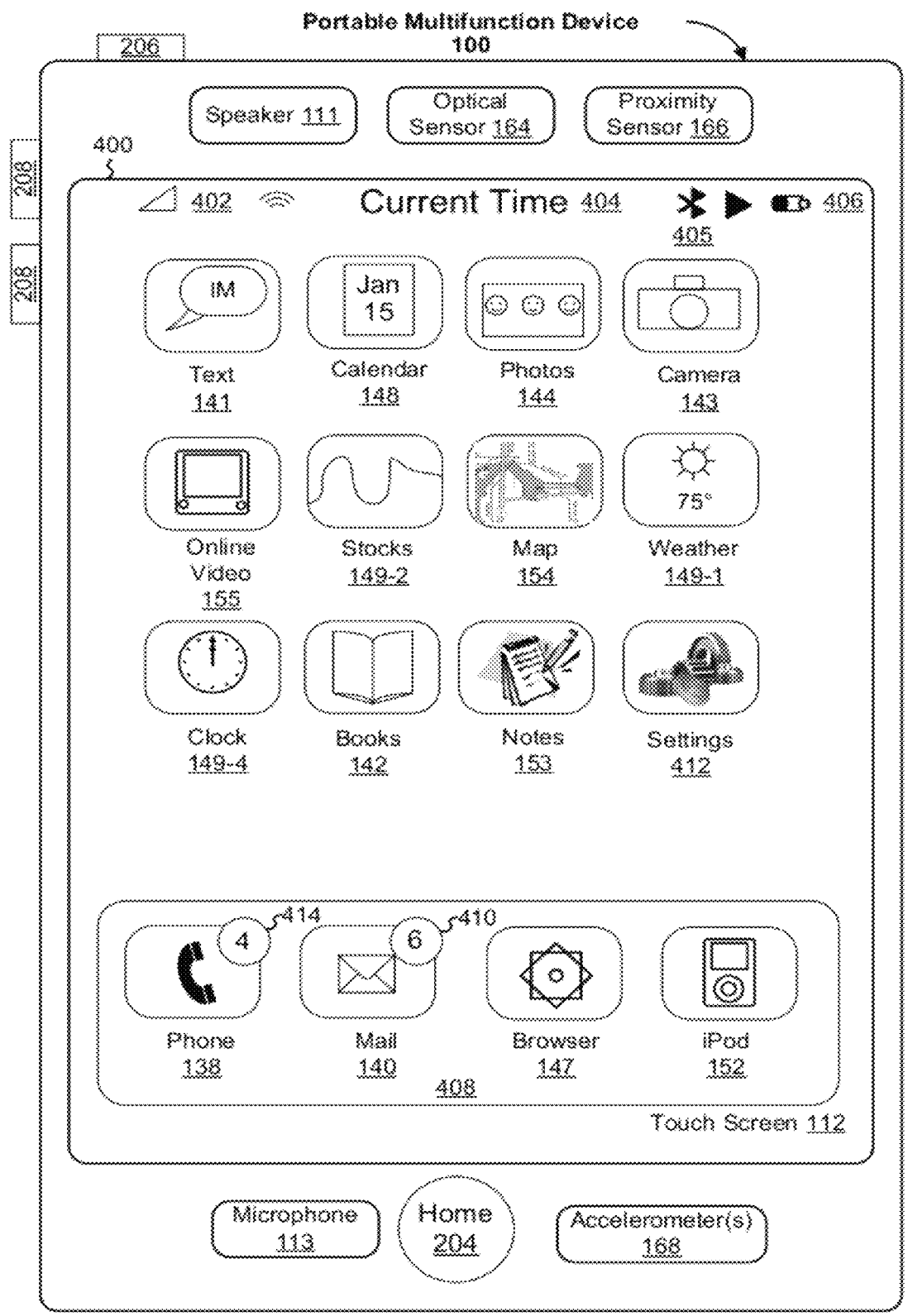
FIG. 4A illustrates an exemplary user interface for a menu of applications on a portable multifunction device in accordance with some embodiments.
Figure 5A:
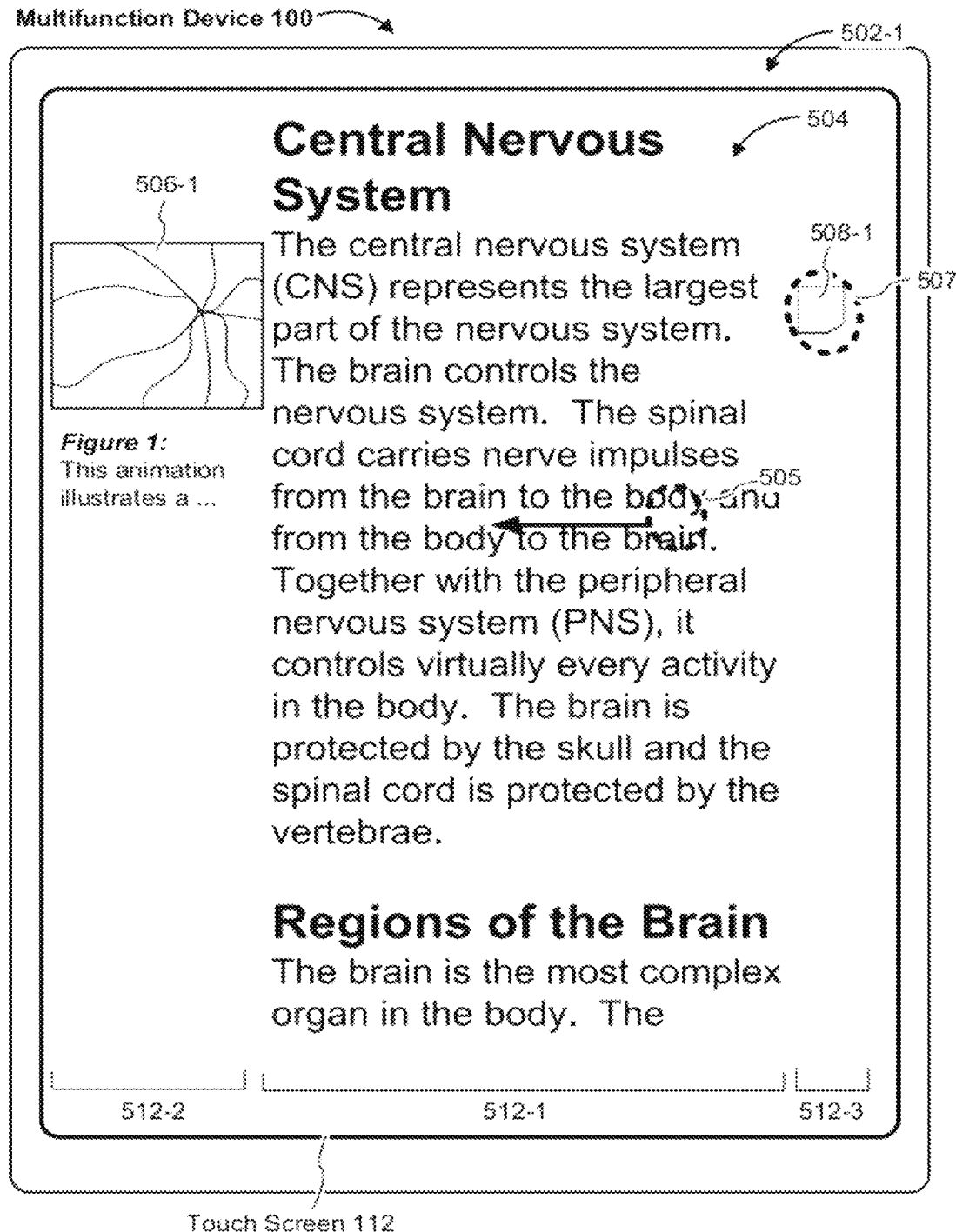
FIGS. 5A-5P illustrate exemplary user interfaces for navigating through an electronic document in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;

Books 142;
Calendar 148;
Alarm clock 149-4;
Map 154;
Notes 153;
Settings 412, which provides access to settings for device 100 and its various applications 136; and
Online video module 155, also referred to as YouTube (trademark of Google Inc.) module 155.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5P illustrate exemplary user interfaces for navigating through an electronic document in accordance with some embodiments. The user interfaces in these figures are used to illustrate the processes described below, including the processes in FIGS. 6A-6C, 7A-7C, and 8-10.

Figure 5B:
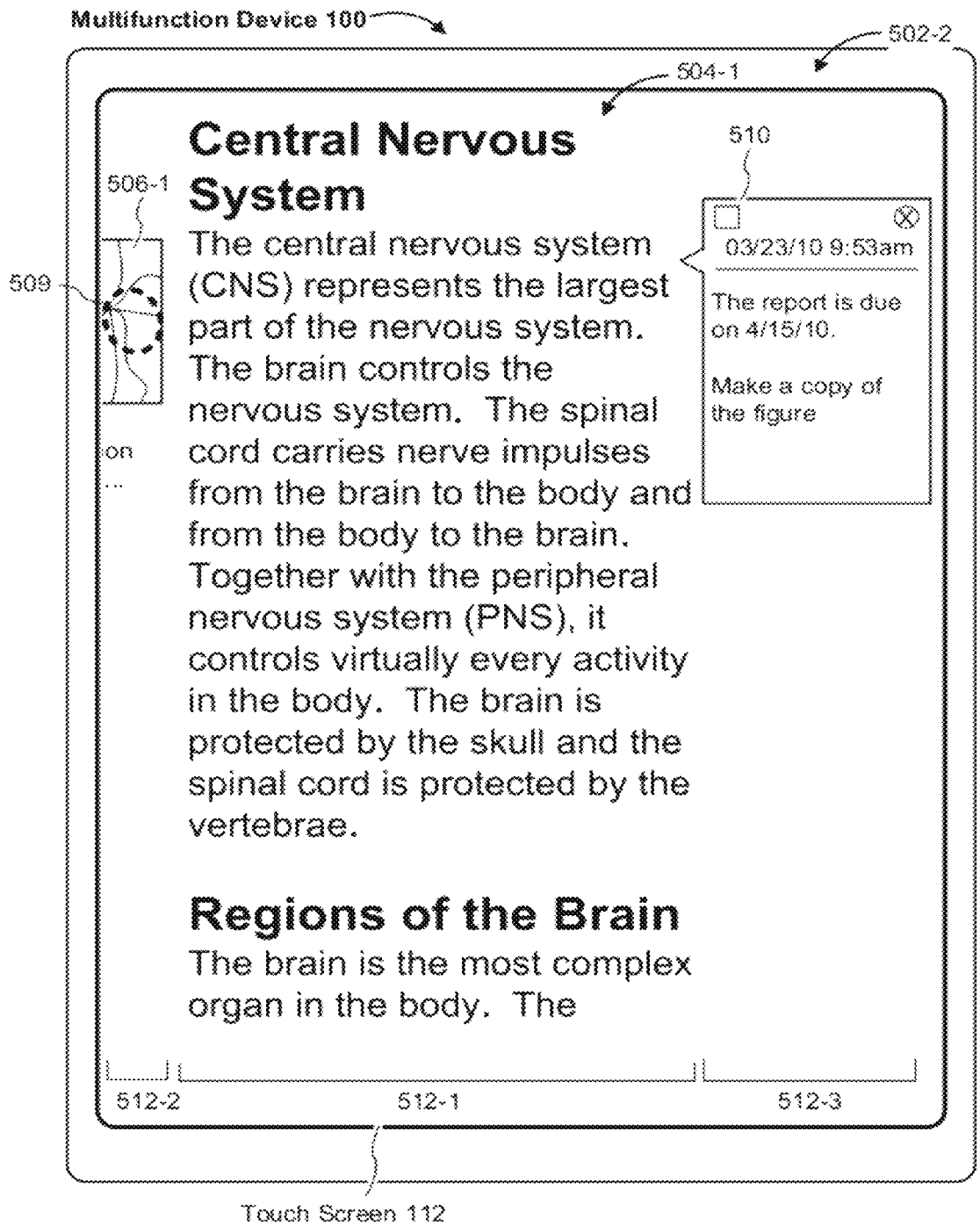
Figure 5C:
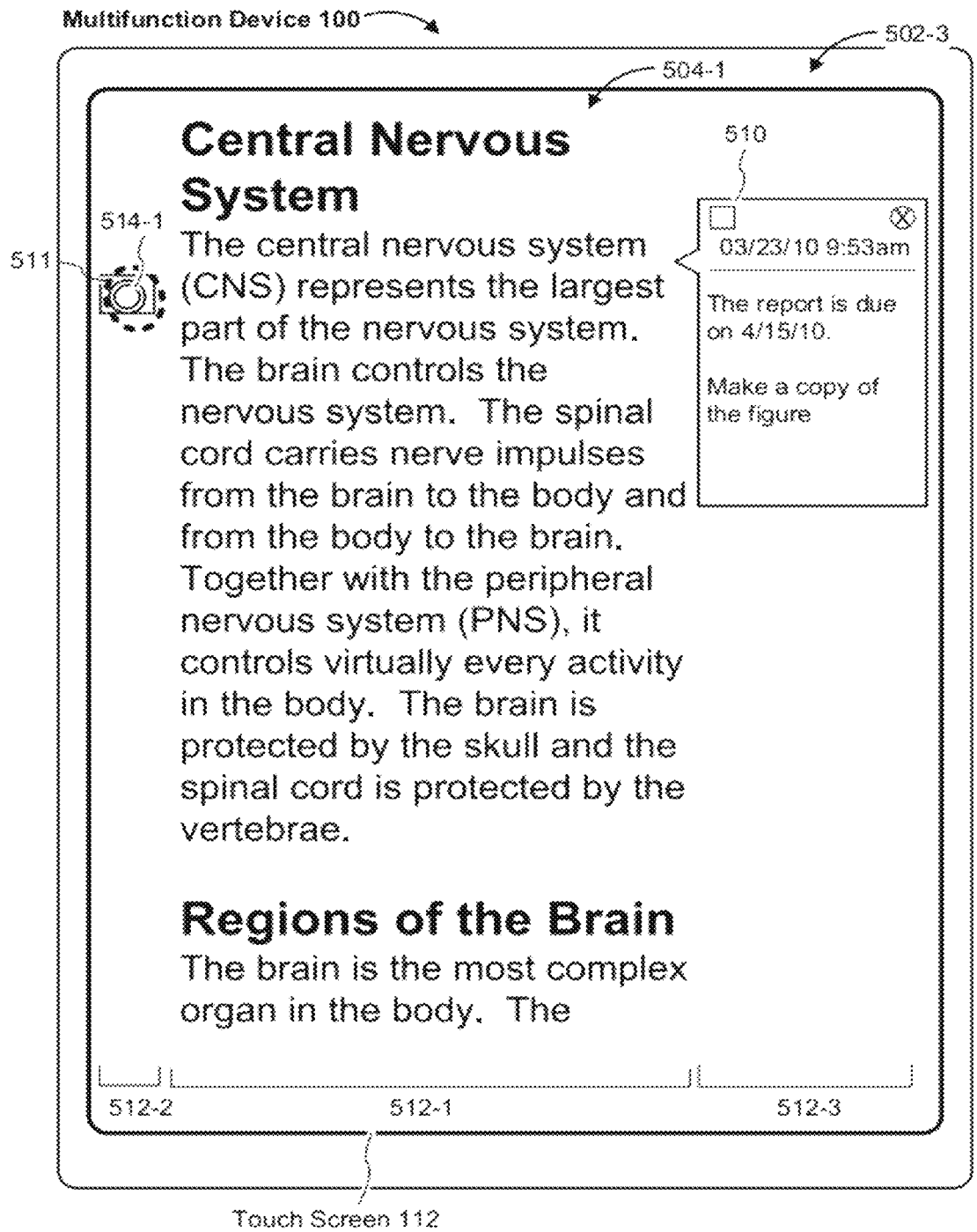

FIGS. 5A-5C illustrate exemplary user interfaces for displaying primary content, supplementary content, and user-generated content in a segmented user interface for an electronic document in accordance with some embodiments.

FIG. 5A illustrates an exemplary user interface 502-1 that includes a representation of a document in a segmented user interface on touch screen 112. The document includes primary content 504 (e.g., main text), supplementary content (e.g., multimedia content such as pictures, figures, movies, slide presentations, animations, HTML 5 widgets, moving photos, etc.), and user-generated content (e.g., notes and other annotations). As illustrated, the document includes at least a FIG. 506-1 and a note (represented by note icon 508-1). As illustrated, the primary content 504 consists primarily (or entirely) of text.

The segmented user interface includes a first segment (e.g., a middle column 512-1), a second segment (e.g., a left-hand column 512-2), and a third segment (e.g., a right-hand column 512-3). The primary content 504 is displayed in the first segment (e.g., the middle column 512-1), and the supplementary content (e.g., FIG. 506-1) is displayed in the second segment (e.g., the left-hand column 512-2). The third segment (e.g., the right-hand column 512-3) includes a representation of the user-generated content (e.g., note icon 508-1).

FIG. 5A also illustrates that a left-swipe gesture 505 is detected on touch screen 112. Alternatively, tap gesture 507 is detected at a location that corresponds to the note icon 508-1 on touch screen 112.

FIG. 5B illustrates a user interface 502-2 displayed in response to detecting either the left-swipe gesture 505 or the tap gesture 507. The user interface 502-2 includes the user-generated content (e.g., note 510) in the third segment (e.g., the right-hand column 512-3). The note 510 includes text previously provided by a user (e.g., "the report is due on Apr. 15, 2010" and "make a copy of the figure").

As illustrated, the display of the primary content (e.g., 504-1) is maintained, and a portion of the previously displayed supplementary content (e.g., FIG. 506-1) ceases to display (i.e., a portion of FIG. 506-1 moves off the touch screen 112).

In some embodiments, the display of the user interface 502-2 includes an animated transition from the user interface 502-1 to the user interface 502-2. For example, the user interface 502-1 slides in a predefined direction (e.g., right-to-left) such that at least a portion of the second segment (e.g., the left-hand column 512-2) slides off the touch screen display 112. In such an example, the direction of the sliding animation (e.g., right-to-left) is perpendicular to a direction in which the content can be scrolled (e.g., bottom-to-top or top-to-bottom).

FIG. 5B also illustrates that a tap gesture 509 is detected at a location that corresponds to the FIG. 506-1. Alternatively, a finger contact may be detected at a location that corresponds to the second segment (e.g., the left-hand column 512-2). In some embodiments, in response to detecting the tap gesture 509 (or a finger contact at a location that corresponds to the second segment), the user interface 502-1 is redisplayed.

FIG. 5C illustrates an alternative user interface 502-3 displayed in response to detecting either the left-swipe gesture 505 or the tap gesture 507 (FIG. 5A). The user interface 502-3 is similar to the user interface 502-2. The difference between the user interface 502-2 and the user interface 502-3 is that the user interface 502-3 includes a photo icon 514-1 instead of a portion of FIG. 506-1. In FIG. 5C, a tap gesture 511 is detected at a location that corresponds to the photo icon 514-1. In some embodiments, in response to detecting the tap gesture 511, the user interface 502-1 is redisplayed. Thus, as shown in FIGS. 5A-5C, a user can easily switch between a display of supplementary content and a display of user-generated content, while maintaining a display of primary content to provide context for the two other types of content.

FIGS. 5D-5P illustrate exemplary user interfaces for navigating through an electronic document in accordance with some embodiments. The electronic document has primary content (e.g., main text) and supplementary content (e.g., multimedia content such as pictures, figures, movies, slide presentations, animations, HTML 5 widgets, moving photos, etc.).

In FIG. 5D, an exemplary user interface 516-1 is displayed on touch screen 112 in a landscape orientation. The user interface 516-1 includes a display of content of the electronic document (e.g., page N of the electronic document, where N is a page number of the displayed content) in a first display mode. The displayed content includes primary content 504-2 (e.g., main text), and supplementary content (e.g., FIGS. 506-1' and 506-2', which are full-scale figures corresponding to FIGS. 506-1 and 506-2 shown in FIG. 5E; conversely, FIGS. 506-1 and 506-2 are reduced-scale figures corresponding to FIGS. 506-1' and 506-2'). As illustrated, the primary content 504-2 and the supplementary content (e.g., FIGS. 506-1' and 506-2') are visually integrated (e.g., the FIGS. 506-1' and 506-2' are displayed inline with the primary content 504-2). The displayed content also includes a note icon 508-1, which represents user-generated content.

Figure 5E:
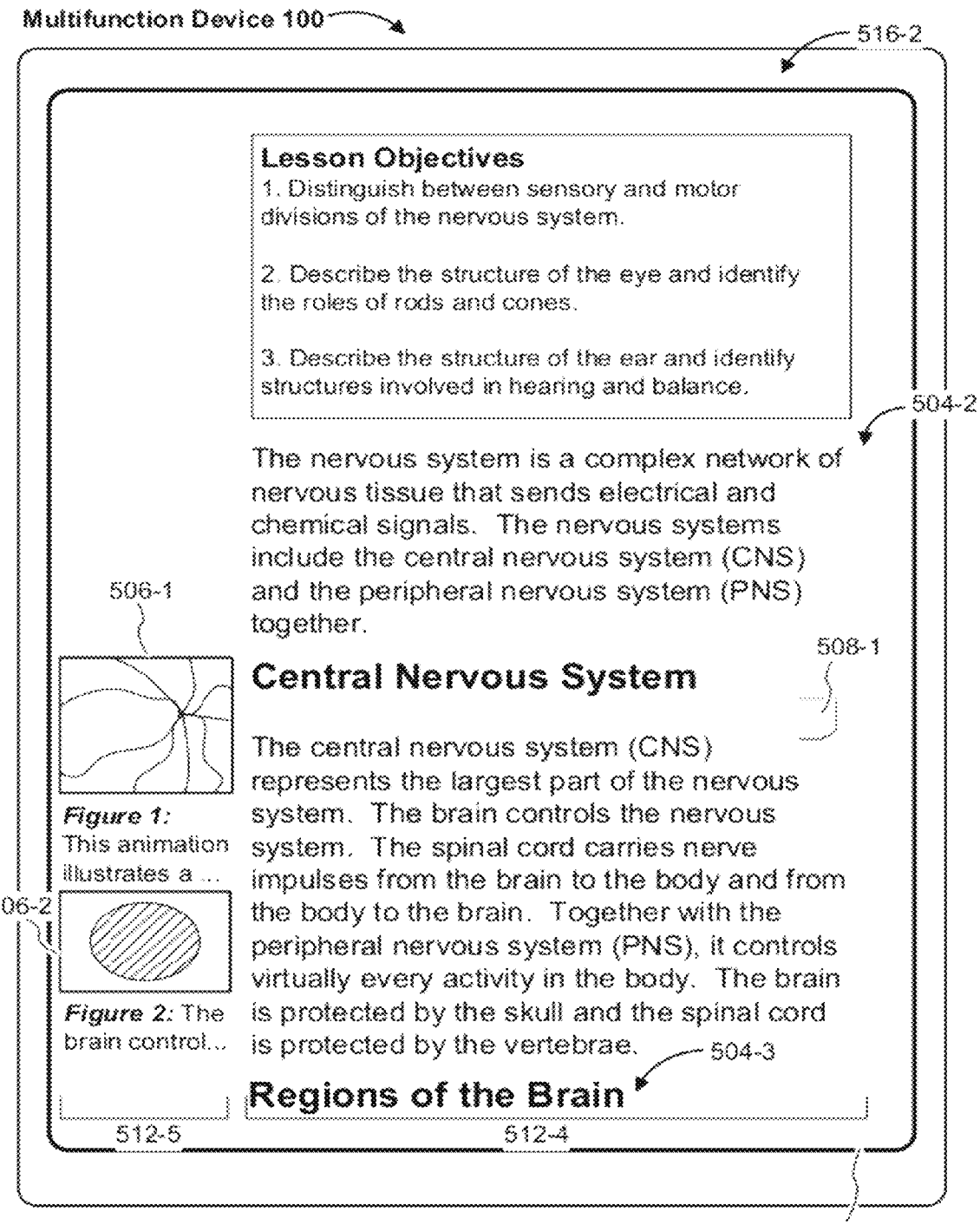

FIG. 5E illustrates an exemplary user interface 516-2 displayed on touch screen 112. As illustrated, the user interface 516-2 is displayed in a portrait orientation. The user interface 516-2 includes reduced-scale FIGS. 506-1 and 506-2 displayed in a left-hand segment 512-5, and primary content 504-2 displayed in a right-hand segment 512-4. Thus, the FIGS. 506-1 and 506-2 are visually segregated from the primary content 504-2. In FIG. 5E, the figures (e.g., 506-1 and 506-2) in the portrait orientation are displayed smaller than the corresponding figures in the landscape orientation (e.g., 506-1' and 506-2', FIG. 5D).

In FIG. 5F, an alternative user interface 516-3 is displayed on touch screen 112. The user interface 516-3 is similar to the user interface 516-2. The difference between the user interface 516-2 and the user interface 516-3 is that the user interface 516-3 includes photo icons (e.g., 514-1 and 514-2) instead of reduced-scale FIGS. 506-1 and 506-2. FIG. 5F also illustrates that a tap gesture 513 is detected at a location that corresponds to the photo icon 514-1.

Figure 5G:
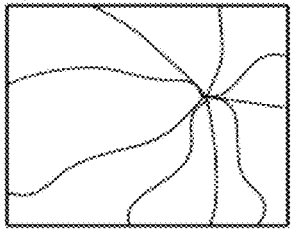

FIG. 5G illustrates that, in some embodiments, in response to detecting the tap gesture 513, the FIG. 506-1' (FIG. 5D) is displayed in an overlay. Alternatively, in some embodiments, in response to detecting the tap gesture 513, the FIG. 506-1 (FIG. 5E) is displayed.

FIG. 5H illustrates an exemplary user interface 516-5 that includes scrolled content of the electronic document in a portrait orientation (e.g., scrolled from content displayed in the user interface 516-2, FIG. 5E). In some embodiments, the user interface 516-5 is displayed in response to a predefined user gesture (e.g., a swipe-up gesture). In some embodiments, the user interface 516-5 is displayed automatically. For example, the displayed content of the electronic document may scroll at a predefined scroll speed (e.g., one line of text per five seconds) without a user input (i.e., until a user input for termination of the automated scroll is received).

Figure 5I:
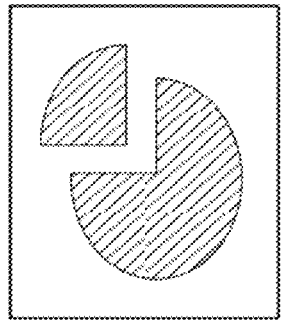

In FIG. 5I, an exemplary user interface 516-6 that includes subsequent content of the electronic document in a landscape orientation (e.g., page 4 of the electronic document, which follows page 3 shown in FIG. 5D). In other words, in some embodiments, in response to detecting a next page gesture on the user interface 516-1 (FIG. 5D), the user interface 516-6 is displayed. Figure 5I also illustrates that one of: a single-contact left-swipe gesture 515, a two-contact left-swipe gesture (including finger contacts 517 and 519), or a single-contact right-swipe gesture 521 may be detected on touch screen 112. It should be noted that gestures illustrated in FIG. 5I are exemplary gestures that may be detected on touch screen 112, and the illustrated gestures are not detected simultaneously. One of the illustrated gestures is detected at a time.

In some embodiments, in response to detecting the single-contact right-swipe gesture (e.g., 521, FIG. 5I), the user interface 516-1 (FIG. 5D) is displayed. As explained above, the user interface 516-1 corresponds to page 3, which immediately precedes page 4 (FIG. 5I). In other words, in some embodiments, in response to detecting a single-contact right-swipe gesture, an immediately preceding page is displayed.

In some embodiments, in response to detecting a two-contact right-swipe gesture, a page corresponding to a beginning of an immediately preceding section or chapter is displayed. Alternatively, in some embodiments, in response to detecting the two-contact right-swipe gesture, a page corresponding to a beginning of a current section or chapter is displayed.

Figure 5J:
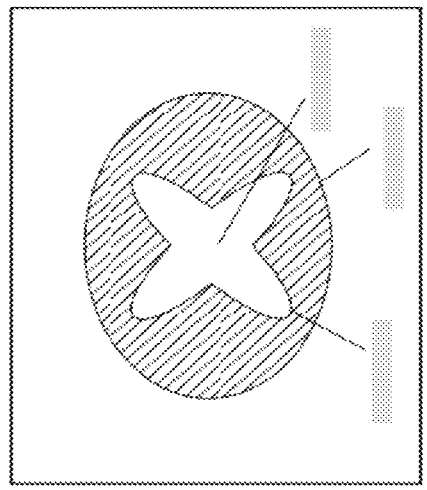

FIG. 5J illustrates that in response to detecting the single-contact left-swipe gesture 515, an exemplary user interface 516-7 is displayed on touch screen 112 (e.g., page 5 in FIG. 5J, which immediately follows page 4 shown in FIG. 5I). In other words, in some embodiments, in response to detecting a single-contact left-swipe gesture, an immediately subsequent page is displayed.

Figure 5K:
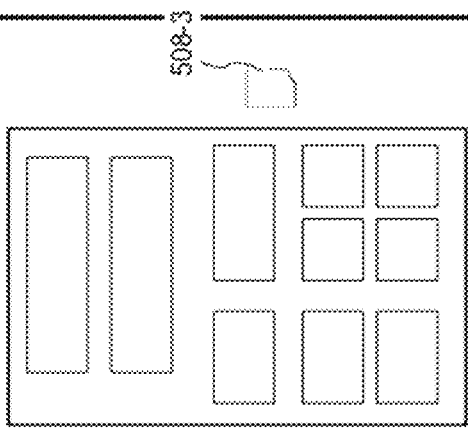

FIG. 5K illustrates that in response to detecting the two-contact left-swipe gesture including finger contacts 517 and 519 (FIG. 5I), an exemplary user interface 516-8 that includes a next section of the electronic document is displayed (e.g., page 9, which is the start of a next section in an electronic textbook). The user interface 516-8 also includes highlighting of text 520-1, and a note icon 508-3 representing an annotation by a user.

Figure 5L:
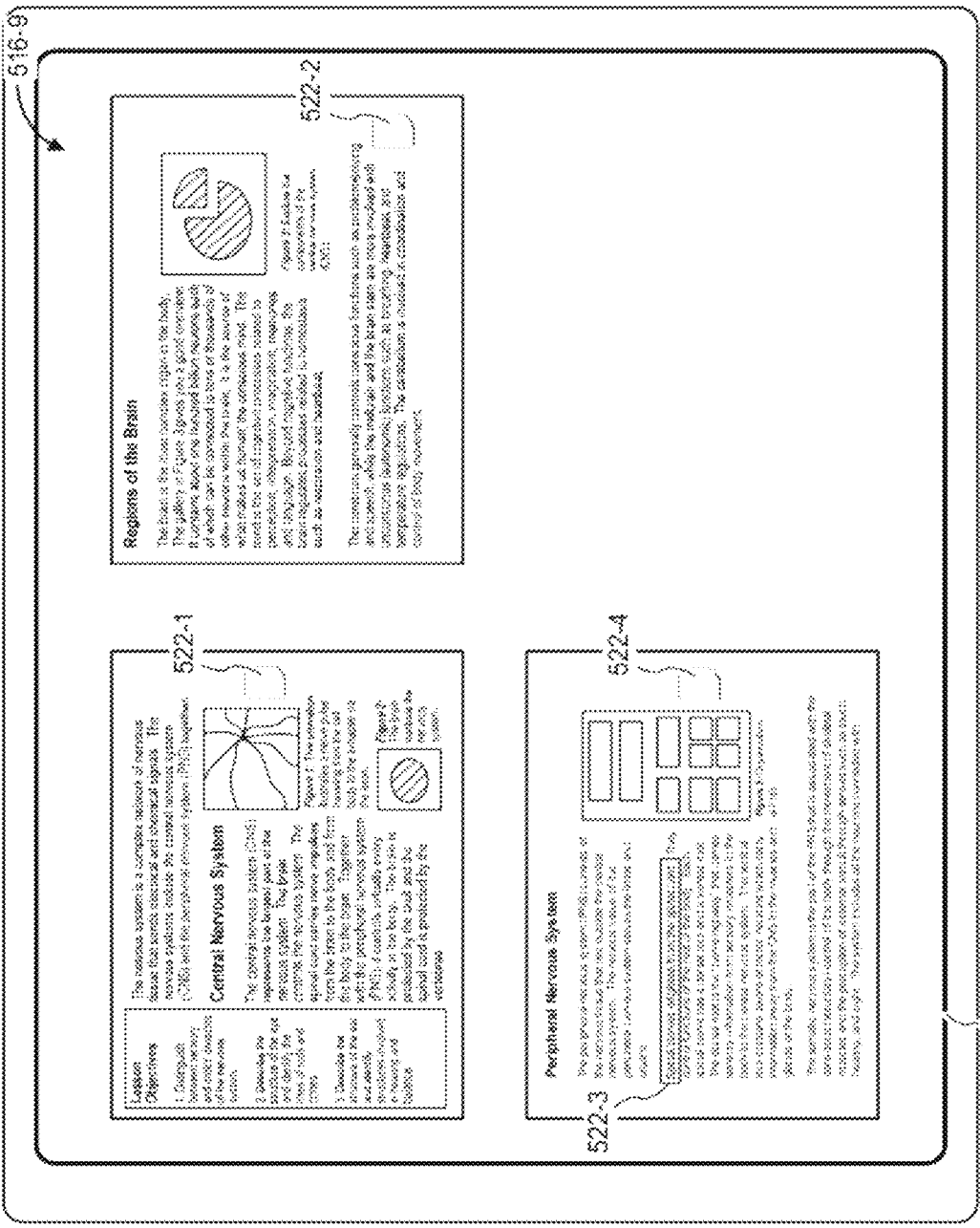
Figure 5P:
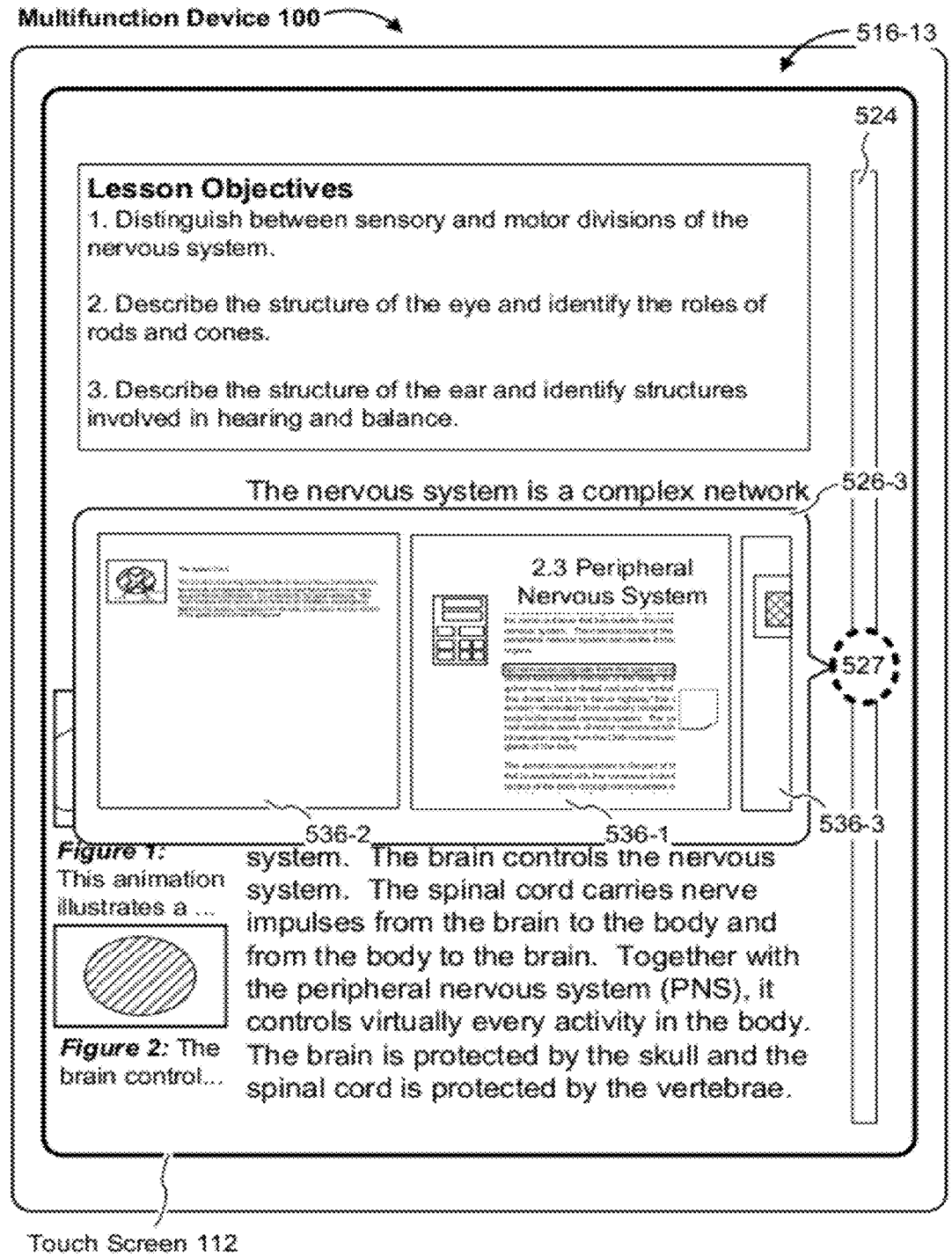

FIG. 5K also illustrates that a pinch gesture including finger contacts 523 and 525 is detected on touch screen 112. In FIG. 5L, in response to the pinch gesture including finger contacts 523 and 525, an array of thumbnail images is displayed. Each thumbnail image in the array represents a page with an annotation.

FIGS. 5M-5P illustrate exemplary user interfaces including a navigation bar in accordance with some embodiments.

In FIG. 5M, an exemplary user interface 516-10 includes content of an electronic document and a navigation bar 524. FIG. 5M also illustrates that a finger contact 527 is detected on a portion of the navigation bar 524.

FIG. 5N illustrates that, in some embodiments, in response to detecting the finger contact 527, a callout 526-1 is displayed on touch screen 112. As illustrated, the callout 526-1 includes a thumbnail of a corresponding page. For example, the callout 526-1 includes main text from a corresponding page, a section title 534, a note icon 528-1, highlighting of a text 528-2, and an image 530-1.

FIG. 5O illustrates an alternative user interface 516-12 that is displayed in response to detecting the finger contact 527, in accordance with some embodiments. The user interface 516-12 includes a callout 526-2 that includes a section title 534, annotation text 528-2 (e.g., "The report is due . . . "), an image 530-2, and a bookmark icon 532. However, unlike the callout 526-1, the callout 526-2 does not include main text from the corresponding page.

FIG. 5P illustrates yet another user interface 516-13 that is displayed in response to detecting the finger contact 527, in accordance with some embodiments. The user interface 516-13 includes a callout 526-3 that includes information representing a plurality of pages. As illustrated, the callout 526-3 includes a thumbnail image of a corresponding page 536-1. The callout 526-3 also includes at least a portion of a thumbnail image of a page immediately preceding the corresponding page (e.g., 536-2) and at least a portion of a thumbnail image of a page immediately following the corresponding page (e.g., 536-3).

The user interfaces in these figures (FIGS. 5A-5P) are used to illustrate the processes described below, including the processes in FIGS. 6A-6C, 7A-7C, and 8-10.

Figure 6A:
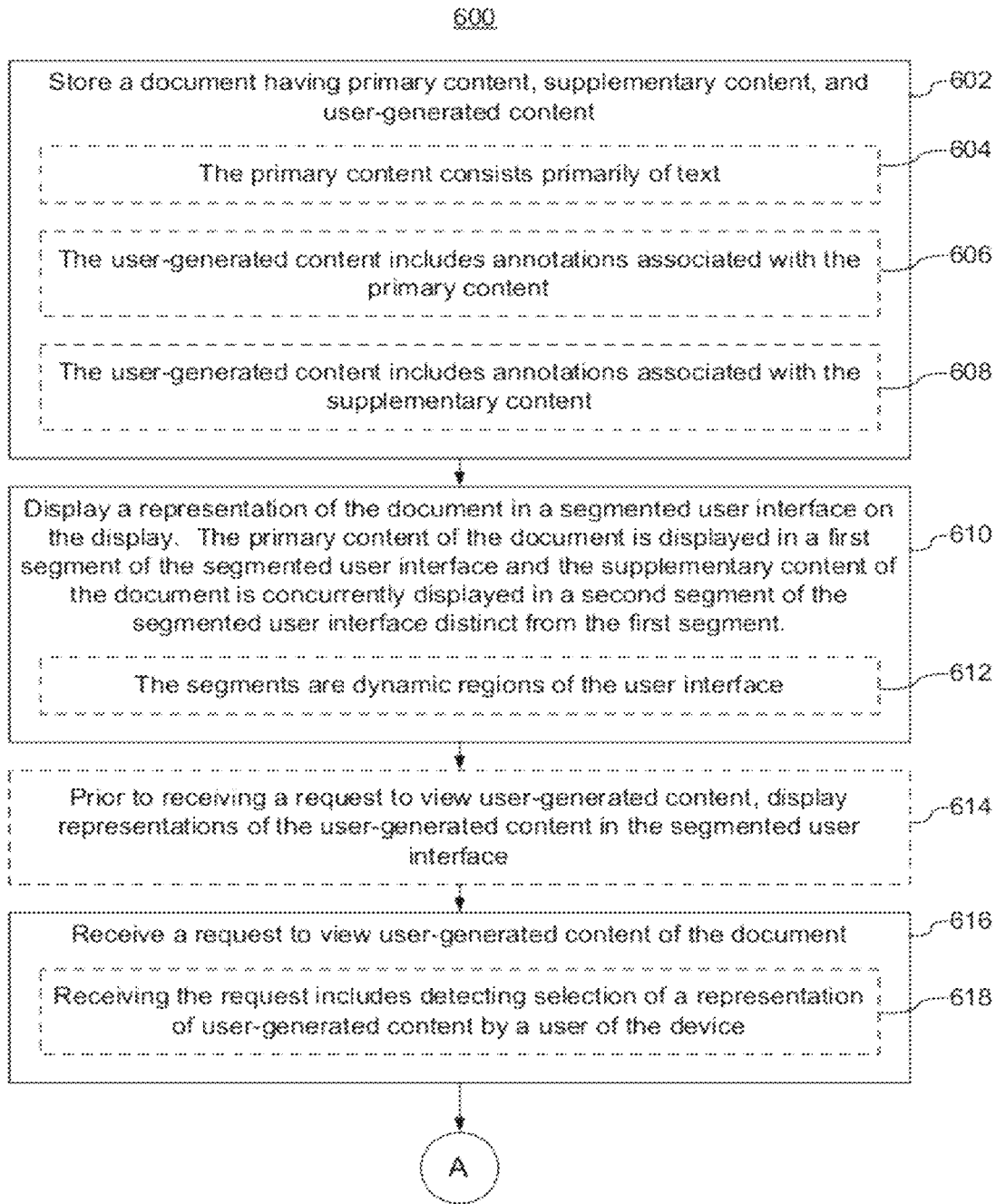
FIGS. 6A-6C are flow diagrams illustrating a method of displaying primary content, supplementary content, and user-generated content in a segmented user interface for an electronic document in accordance with some embodiments.
Figure 6B:
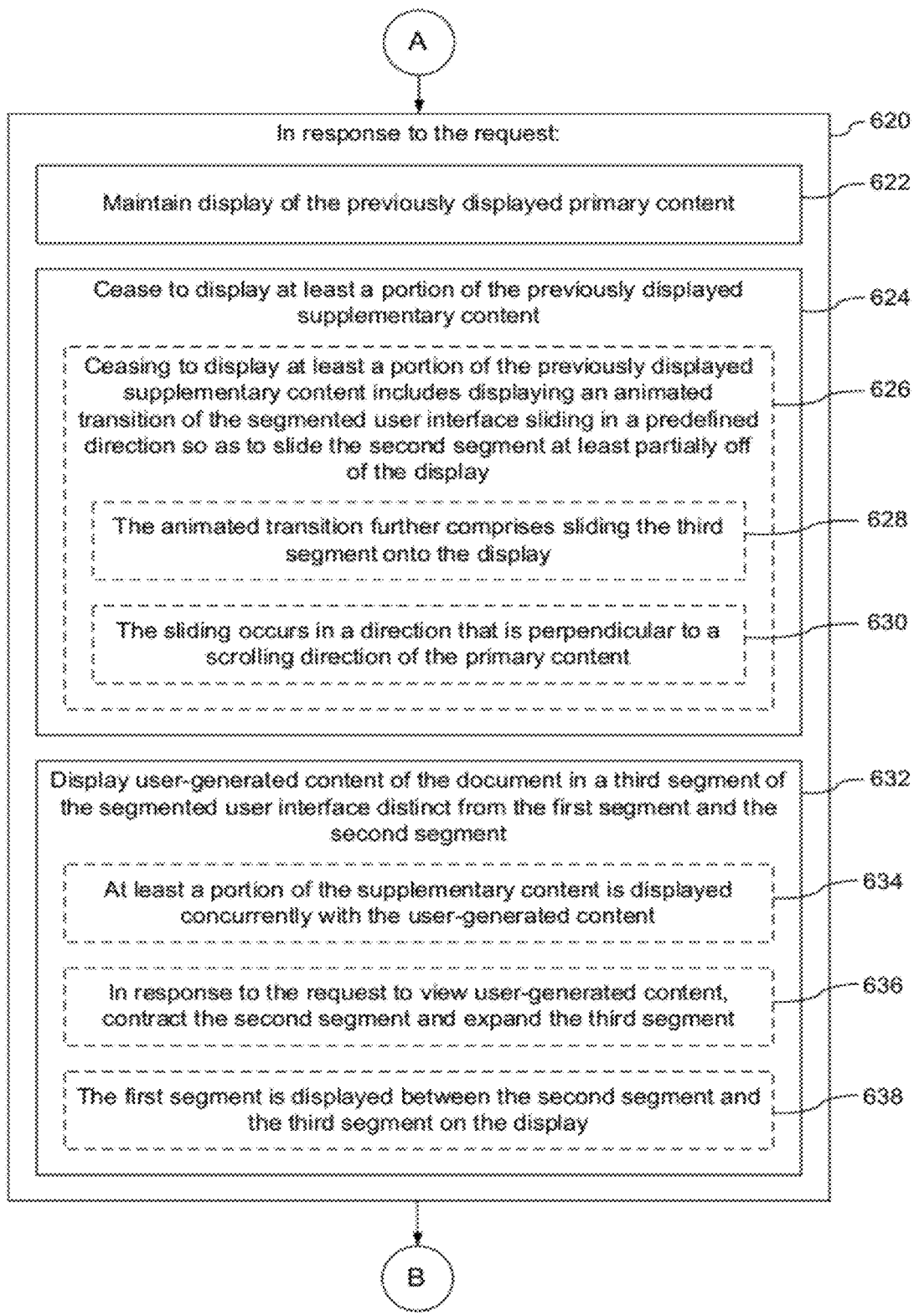
Figure 6C:
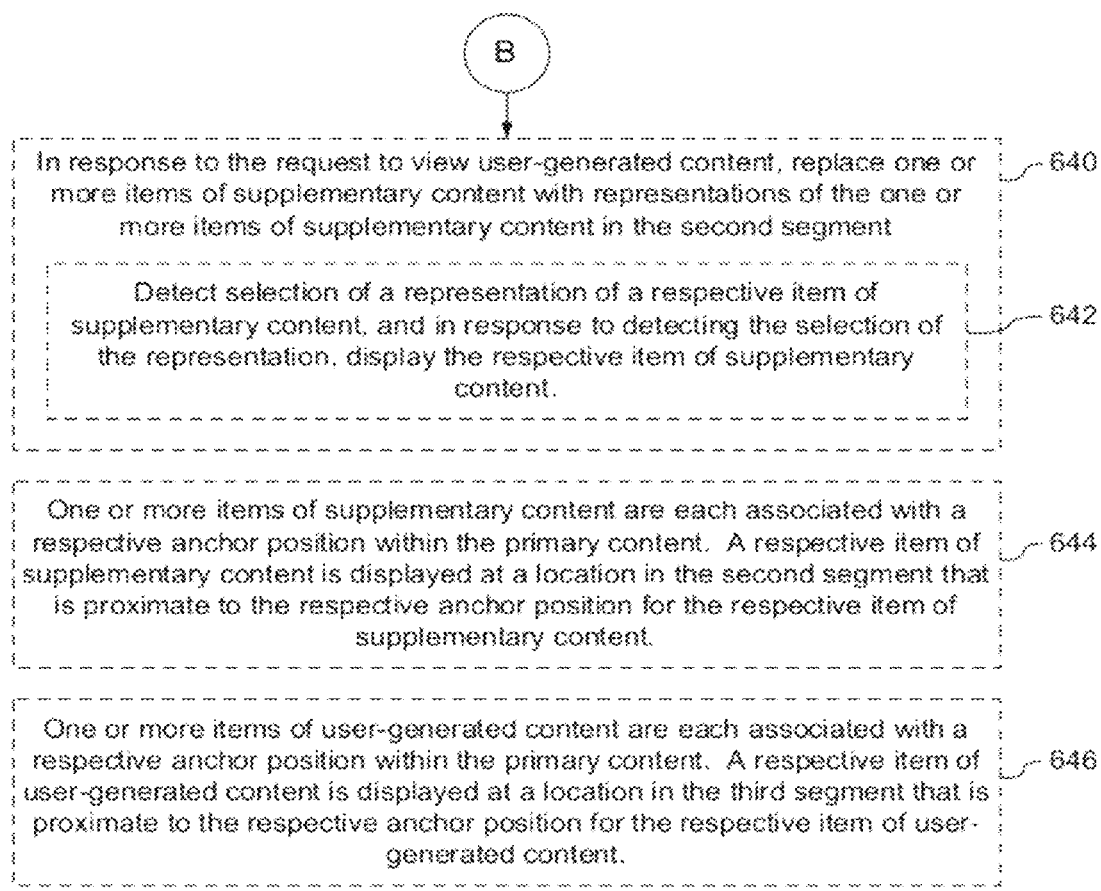

FIGS. 6A-6C are flow diagrams illustrating method 600 of displaying primary content, supplementary content, and user-generated content in a segmented user interface for an electronic document in accordance with some embodiments. Method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to display primary content, supplementary content, and user-generated content in a segmented user interface. Electronic devices with limited screen areas may not be able to simultaneously display primary content, supplementary content, and user-generated content so that all three can be concurrently viewed without cluttering the display. The method addresses this problem by enabling a user to switch between displaying a segment (e.g., a column) with supplementary content and displaying a segment with user-generated content while maintaining display of a segment with primary content (e.g., to provide context for the other two types of content). This enables a user to focus on the primary content, yet also have ready access to other types of content (e.g., supplementary content or user-generated content), in context and as needed.

The device stores (602) a document having primary content (e.g., text), supplementary content, (e.g., multimedia content such as pictures, figures, movies, slide presentations, animations, HTML 5 widgets, moving photos, etc.) and user-generated content (e.g., notes and other user annotations).

In some embodiments, the primary content consists (604) primarily of text. In other words, more than 50%, 80%, 90% or some other reasonable value of the primary content is text (e.g., because supplementary content that would otherwise be integrated with the primary content is instead displayed in the second region/segment). In some embodiments, the percentage of text in the primary content is determined based on an area covered by the primary content and an area covered by text in the primary content. For example, the primary content 504 in FIG. 5A consists entirely of text.

In some embodiments, the user-generated content includes (606) annotations associated with the primary content. For example, the note text "The report is due on Apr. 15, 2010" in FIG. 5B is related to the displayed primary content, "central nervous system".

In some embodiments, the user-generated content (608) includes annotations associated with the supplementary content. For example, the note text "make a copy of the figure" in FIG. 5B is related to the supplementary content (e.g., the FIG. 506-1).

The device displays (610) a representation of the document in a segmented user interface on the display. As used herein with respect to method 600, a "segmented" user interface refers to a multi-column or multi-row user interface. For example, the user interface 502-1 (FIG. 5A) includes multiple columns (e.g., the middle column 512-1, the left-hand column 512-2, and the right-hand column 512-3). The primary content of the document is displayed in a first segment (e.g., a first column) of the segmented user interface and the supplementary content of the document is concurrently displayed in a second segment (e.g., a second column) of the segmented user interface distinct from the first segment. For example, in FIG. 5A, the primary content 504 is displayed in the middle column 512-1, and the supplemental content (e.g., FIG. 506-1) is displayed in the left-hand column 512-2. In some embodiments, segments in the segmented user interface have visible boundaries. In some embodiments, no segment in the segmented user interface has a visible boundary between segments (e.g., FIG. 5A).

In some embodiments, segments are (612) dynamic regions of the user interface. In other words, the segments of the user interface can change size and shape in response to user inputs (e.g., a tap and drag gesture on a boundary of a dynamic region causes the device to enlarge or contract the dynamic region, or selection of a dynamic region expand/collapse icon expands or collapses a respective dynamic region associated with the expand/collapse icon).

In some embodiments, prior to receiving the request to view user-generated content, the device displays (614) representations of the user-generated content in the segmented user interface (e.g., the note icon 508-1, FIG. 5A, or other flags/markers/carets that indicate that there are annotations associated with the primary content that are not fully displayed).

The device receives (616) a request to view user-generated content of the document (e.g., via a gesture on the touch-sensitive surface). In some embodiments, the request is a finger gesture (e.g., the left-swipe gesture 505, FIG. 5A).

In some embodiments, receiving the request includes (618) detecting selection of a representation of user-generated content by a user of the device (e.g., tap gesture 507 on the touch-sensitive surface at a location that corresponds to a location of the note icon 508-1 on the display, FIG. 5A).

In response to the request (620), the device maintains (622) display of the previously displayed primary content, ceases (624) to display at least a portion of the previously displayed supplementary content, and displays (632) user-generated content of the document in a third segment of the segmented user interface distinct from the first segment and the second segment. For example, in FIG. 5B, the display of the primary content 504-1 is maintained, and the user-generated content 510 is displayed. In addition, a portion of the supplementary content (the FIG. 506-1) ceases to be displayed.

In some embodiments, ceasing to display at least a portion of the previously displayed supplementary content includes (626) displaying an animated transition of the segmented user interface sliding in a predefined direction (e.g., to the left on the display) so as to slide the second segment at least partially off of the display.

In some embodiments, the animated transition further comprises (628) sliding the third segment onto the display (e.g., in FIG. 5B, the note 510 may slide in from the right-hand edge of touch screen 112).

In some embodiments, the sliding occurs (630) in a direction (e.g., horizontally) that is perpendicular to a scrolling direction of the primary content (e.g., vertically). In some embodiments, the content is restricted to scroll in one direction (e.g., vertically). As one example, when the content is restricted to scroll vertically on the display, the sliding occurs in a horizontal direction on the display.

In some embodiments, at least a portion of the supplementary content is (634) displayed concurrently with the user-generated content (e.g., a portion of supplementary content 506-1 is displayed with note 510 in FIG. 5B). For example, the previously displayed supplementary content is partially covered by the user-generated content, or the second segment is translated horizontally or vertically, so that only an edge of the supplementary content is displayed on the display.

In some embodiments, in response to the request to view user-generated content, the device contracts (636) the second segment and expands the third segment. For example, in a transition from the user interface 502-1 (FIG. 5A) to the user interface 502-2 (FIG. 5B), the second segment (e.g., the left-hand column 512-2) contracts and the third segment (e.g., the right-hand column 512-3) expands. In some embodiments, the third segment is initially displayed at a small size and indicators of the user-generated content are displayed within the third segment (e.g., note icon 508-1 in the right-hand column 512-3, FIG. 5A).

In some embodiments, the first segment is (638) displayed between the second segment and the third segment on the display (e.g., the middle column 512-1 with the primary content 504 is located between the left-hand column 512-2 and the right-hand column 512-3, FIG. 5A). In some embodiments, the first segment (including the primary content) is displayed in a central region, the second segment (including the supplementary content) is displayed to the left of the first segment, and the third segment (including the user-generated content) is displayed to the right of the first segment (e.g., FIG. 5A) or vice versa.

In some embodiments, in response to the request to view user-generated content, the device replaces (640) one or more items of supplementary content with representations (e.g., thumbnails, icons, etc.) of the one or more items of supplementary content in the second segment. In other words, ceasing to display at least the portion of the previously displayed supplementary content includes ceasing to display one or more of the items of supplementary content and replacing the items of supplementary content with thumbnails, icons or other representations so as to provide a user of the device with an indication that the supplementary content is available and to provide the user with access to the hidden supplementary content. For example, in FIG. 5C, the FIG. 506-1 is replaced with a photo icon 514-1.

In some embodiments, the device detects (642) selection of a representation of a respective item of supplementary content (e.g., tap gesture 509, FIG. 5B), and in response to detecting the selection of the representation, displays the respective item of supplementary content (e.g., display the user interface 502-1, FIG. 5A). In some embodiments, the respective item of supplementary content is displayed without changing the layout of the segmented user interface (e.g., in some embodiments, the FIG. 506-1' is displayed in an overlay without horizontally sliding the user interface). In some embodiments, the device ceases to display the user-generated content and redisplays the supplemental content (e.g., FIG. 5A). In either case, the user has one-click/one-tap access to the supplementary content even when at least a portion of the supplementary content has ceased to be displayed.

In some embodiments, one or more items of supplementary content are (644) each associated with a respective anchor position within the primary content. A respective item of supplementary content is displayed at a location in the second segment that is proximate (e.g., adjacent) to the respective anchor position for the respective item of supplementary content. In some embodiments, a plurality of images, figures, videos and other multimedia content each have an insertion point or other anchor position (e.g., a paragraph, caption, or other block of text associated with an item of supplementary content) determined by the publisher or author of the electronic document. For example, in FIG. 5A, the FIG. 506-1 is associated with an anchor position that corresponds to the term "central nervous system" of the first sentence, and the FIG. 506-1 is displayed at a location proximate to the term "central nervous system."

In some embodiments, one or more items of user-generated content are (646) each associated with a respective anchor position within the primary content. A respective item of user-generated content is displayed at a location in the third segment that is proximate (e.g., adjacent) to the respective anchor position for the respective item of user-generated content. In some embodiments, a plurality of notes each have an insertion point or other anchor position (e.g., a paragraph, caption, or other block of text associated with an item of supplementary content) determined by the user (e.g., by creating a note associated with highlighted text). For example, in FIG. 5A, the note icon 508-1 is associated with an anchor position that corresponds to the caption "Central Nervous System," and the note icon 508-1 is displayed at a location proximate to the caption "Central Nervous System."

FIGS. 7A-7C are flow diagrams illustrating method 700 of displaying primary and supplementary content in an electronic document in visually integrated and visually segregated display modes in accordance with some embodiments. Method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to adjust display of primary content and supplementary content of an electronic document. In some instances, a user may want to read content of the electronic document in a visually integrated display mode (e.g., the content of the electronic document is arranged in a layout determined by a publisher) when the correlation between primary content and supplementary content is beneficial. And in some other instances, the user may want to read content of the electronic document in a visually segregated display mode, when for example, the user wants to focus on the main text of the electronic document. The method provides an easy mechanism to switch between the visually integrated display mode and the visually segregated display mode, thereby creating a more efficient human-machine interface.

The device stores (702) a document (e.g., electronic book, magazine, newspaper, article, textbook, pdf, etc.) having primary content (e.g., text) and supplementary content (e.g., multimedia content such as pictures, figures, movies, slide presentation, animations, HTML 5 widgets, moving photos, etc.).

The device displays (704) content of the document in a first display mode of a document presentation application (e.g., an ebook reader, a pdf reader, etc.). The supplementary content is visually integrated with the primary content in the first display mode (e.g., interspersed with, interwoven, intermixed, displayed inline, displayed in a creator-specified format, etc.) In other words, in the first display mode, the supplementary content is not restricted to one or more predefined regions, but is displayed among the primary content (e.g., in a "print" layout specified by a creator or author). For example, in FIG. 5D, the supplementary content, such as FIGS. 506-1' and 506-2', is interspersed with the primary content 504-2.

In some embodiments, visually integrating the supplementary content with the primary content in the first display mode includes (706) displaying the supplementary content inline with the primary content (e.g., in FIG. 5D, the supplementary content, such as FIGS. 506-1' and 506-2', are displayed in line with the primary content 504-2).

In some embodiments, a plurality of items of supplementary content are (708) concurrently displayed in the first display mode (e.g., FIGS. 506-1' and 506-2', FIG. 5D). In some embodiments, two or more of the items of supplementary content are displayed simultaneously with at least a portion of the primary content (e.g., FIGS. 506-1' and 506-2' and the primary content 504-2, FIG. 5D). In some embodiments, a plurality of corresponding representations of items of supplementary content are concurrently displayed in the first display mode. For example, photo icons may be displayed instead of the figures.

In some embodiments, the first display mode is (710) a creator-specified display mode in which the primary content and supplementary content are arranged in accordance with a template specified by a creator (e.g., publisher, author, etc.) of the document. In other words, the creator determines in advance the layout of the primary content and the supplementary content. Thus, the first display mode is also called a print layout mode.

While displaying content of the document in the first display mode, the device receives (712) a request to display content of the document in a second display mode of the document presentation application. This enables the device to switch directly from the first display mode to the second display mode.

In some embodiments, receiving the request to display content of the document in the second display mode includes (714) detecting rotation of the device (e.g., the device detects rotation from a landscape orientation to a portrait orientation or vice versa). For example, the device detects rotation of the device in accordance with input detected from a gyroscope, accelerometer, or other orientation sensor.

In some embodiments, the second display mode is (716) a text-review display mode in which two or more portions of text in the primary content that are displayed as distinct blocks of text in the creator-specified display mode are displayed in a same contiguous block of text (e.g., the two or more blocks of text are identified as distinct blocks of text in the template specified by the creator). In particular, two portions of text that are separated by a figure, image, column break, page break, etc. are displayed together in a single column view to make the text easier to review for the user. For example, in FIG. 5E, the user interface 516-2 includes text 504-2 from a particular page (including the caption, "central nervous system") and text 504-3 from a following page (e.g., the caption, "regions of the brain") displayed together in a block of text that does not have supplementary content interspersed within the block of text.

In some embodiments, the first display mode and the second display mode are (718) both display modes for use by an end user to view the document on the device (e.g., a rendering of at least a subset of the document content). In other words, the two display modes are not authoring modes of an authoring application (e.g., website authoring, desktop publishing, etc.).

In response to the request, the device displays (720) content of the document in the second display mode, with representations of the supplementary content visually segregated from the primary content in the second display mode. For example, in FIG. 5E, the supplementary content is displayed in the left-hand column 512-5 and the primary content 504-2 is displayed in the right-hand column 512-4. In some embodiments, the representations of the supplementary content include the supplementary content displayed in the first display mode (e.g., full-scale FIGS. 506-1' and 506-2' in FIG. 5D). In some embodiments, the representations of the supplementary content include icons representing the supplementary content. In some embodiments, the representations of the supplementary content include reduced scale representations of the supplementary content (e.g., FIGS. 506-1 and 506-2 in FIG. 5E as reduced scale representations of FIGS. 506-1' and 506-2'). Typically, only a portion of the content of the document is displayed and thus only a portion of the primary content and only a portion of the supplementary content are displayed at any given time.

In some embodiments, visually segregating the representations of the supplementary content from the primary content in the second display mode includes (722) displaying the primary content in a first region of a user interface that does not include the supplementary content (e.g., primary content 504-2 in the right-hand column 512-4, FIG. 5E), and displaying the representations of the supplementary content in a second region of the user interface that is distinct from the first region of the user interface and that does not include the primary content (e.g., FIGS. 506-1 and 506-2 in the left-hand column 512-5, FIG. 5E).

In some embodiments, an item of supplementary content is (724) displayed at a first size on the display in the first display mode, and a representation of the item of supplementary content is displayed in the second display mode. The representation of the item of supplementary content has a second size on the display that is smaller than the first size. For example, the FIG. 506-1 in the user interface 516-2 (FIG. 5E) is smaller than the corresponding FIG. 506-1' in the user interface 516-1 (FIG. 5D). In some embodiments, the supplementary content is smaller in second display mode than in the first display mode, so as to reduce the amount of the screen area that is taken up with the supplementary content and thus provide more space on the display for the primary content.

In some embodiments, in the first display mode, the supplementary content includes (726) one or more items of supplementary content (e.g., FIGS. 506-1' and 506-2', FIG. 5D). In the second display mode, the device displays one or more supplementary content icons that replace corresponding items of supplementary content displayed in the first display mode (e.g., thumbnails or content-specific icons indicating a type of content, such as photo icons 514-1 and 514-2, FIG. 5F). The device detects selection of a respective supplementary content icon (e.g., tap gesture 513, FIG. 5F), and in response to detecting the selection, displays a corresponding item of supplementary content on the display (e.g., the FIG. 506-1' in FIG. 5G). In other words, the second display mode is optimized for displaying text while deemphasizing other content, yet the second display mode still provides quick (e.g., one-click/one-tap) access to the multimedia content. In some embodiments, the multimedia content (when selected) is displayed as an (interactive) overlay/popover (e.g., the FIG. 506-1', FIG. 5G). In some embodiments, the supplementary content icons are displayed in a predefined area of the display (e.g., along a left edge of the display (e.g., the FIG. 506-1, FIG. 5E).

In some embodiments, the first display mode has (728) a first content advancement direction (e.g., a direction in which text moves on the display when the device detects a request to advance the content, such as by scrolling or by navigating to a next page) with respect to a reading direction of text in the primary content (e.g., the advancement direction is parallel to the left-to-right direction of the text), and the second display mode has a second content advancement direction that is distinct from the first content advancement direction with respect to the reading direction of the text in the primary content (e.g., the advancement direction is perpendicular to the left-to-right direction of the text). For example, in the first display mode, detecting a right-to-left swipe gesture will cause the device to advance to a next page; and detecting a left-to-right swipe gesture will cause the device to navigate backwards to a previous page. In contrast, in the second display mode, detecting a bottom-to-top swipe gesture will cause the device to scroll the primary content upwards to reveal a next portion of the content; and detecting a top-to-bottom swipe gesture will cause the device to scroll the primary content downwards to reveal a previous portion of the content.

In some embodiments, the primary content includes (730) a plurality of page boundaries. The device detects a request to navigate through the document (e.g., a swipe gesture on the touch-sensitive surface or a tap and hold/click and hold gesture/input on a content advancement icon). In response to detecting the request to navigate through the document, in accordance with a determination that the device is in the first display mode, the device navigates to a sequentially adjacent page (e.g., a next page or a previous page) in accordance with the page boundaries (e.g., the content is displayed in full page increments, such as page 1, page 2, etc, as is typical in a desktop publishing application or a book), and in accordance with a determination that the device is in the second display mode, the device scrolls through the document in accordance with a magnitude of a value associated with the request (e.g., scrolling through the document continuously in accordance with a distance/speed/duration of a swipe gesture or selection of a content advancement icon, as is typical for a webpage or other document without page breaks). For example, in response to detecting a request to navigate through the document, the device navigates from the user interface 516-1 (FIG. 5D) to the user interface 516-6 corresponding to a next page (FIG. 5I) in the first display mode, whereas the device navigates from the user interface 516-2 (FIG. 5E) to the user interface 516-5 (FIG. 5H) including a portion of the user interface 516-2 and a continuously following portion of the document in the second display mode.

In some embodiments, a respective item of supplementary content is (732) associated with a predefined portion of the primary content. The respective item of supplementary content is displayed proximate to the predefined portion of primary content in the first display mode, and a representation of the respective item of supplementary content is displayed proximate to the predefined portion of primary content in the second display mode. For example, in FIG. 5D, the FIG. 506-1' is associated with the term "central nervous system" in the primary content 504-2. In FIG. 5D, the FIG. 506-1' is displayed proximate to the term "central nervous system" in the landscape mode, and in FIG. 5E, the FIG. 506-1 is also displayed proximate to the term "central nervous system" in the portrait mode.

While displaying the predefined portion of the primary content and the representation of the respective item of supplementary content in the second display mode, the device detects (734) a request to navigate through the primary content. In response to detecting the request to navigate through the primary content, the device repositions the predefined portion of the primary content to an updated location on the display in accordance with the request to navigate through the primary content, and repositions the representation of the respective item of supplementary content on the display in accordance with the updated location of the predefined portion of the primary content. For example, when the content of the electronic document is scrolled (from FIG. 5E to FIG. 5H), the FIG. 506-1 is displayed at an updated location of the term "central nervous system" in the primary content. It should be understood that when the primary content and respective item of supplementary content are displayed in the second display mode, the supplementary content will move synchronously with the primary content in the second display mode.

In some embodiments, the device has (736) a long axis and a short axis. In the first display mode, a reading direction (e.g., a primary reading direction) of the text is aligned with the long axis (e.g., FIG. 5D). In the second display mode, the reading direction of the text is aligned with the short axis (e.g., FIG. 5E). For example, for English, the primary reading direction is left-to-right; and for Hebrew the primary reading direction is right-to-left.

In some embodiments, while displaying content of the document in the second display mode, the device receives a request to display content of the document in the first display mode of the document presentation application (e.g., the device detects rotation of the device from a portrait orientation to a landscape orientation). In response, the device displays content of the document in the first display mode.

FIG. 8 is a flow diagram illustrating method 800 of navigating through an electronic document with single contact and multi-contact gestures in accordance with some embodiments. Method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to navigate through an electronic document. The method enables a user to navigate through an electronic document page-by-page, chapter-by-chapter, or annotation-by-annotation based on user gestures. The method provides a faster way to navigate through an electronic document, in particular to important portions of the electronic document (e.g., portions annotated by the user), thereby creating a more efficient human-machine interface. For battery-operated electronic devices, enabling a user to navigate through an electronic document faster and more efficiently conserves power and increases the time between battery charges.

The device stores (802) a document having a plurality of features having respective locations within the document. The plurality of features includes features of a first feature type in a first sequence and features of a second feature type in a second sequence. The second feature type is distinct from the first feature type.

In some embodiments, the first feature type is (804) a page or a page break.

In some embodiments, the second feature type is (806) one of: a section, a section break, a chapter, a chapter break or an annotation. In other words, the second feature type is a non-page break feature (i.e., neither a page nor a page break).

The device displays (808) at least a portion of the document on the display. In some embodiments, the displayed portion corresponds to a feature of the first type (e.g., a respective page) and also corresponds to a feature of the second type (e.g., a respective section, chapter, annotation etc.). For example, the portion of the document illustrated in FIG. 5I corresponds to a respective page, and also corresponds to a respective section (with a section title, "Regions of the Brain").

The device detects (810) a first gesture on the touch-sensitive surface (e.g., a single-finger left-swipe gesture 515 or a two-finger left-swipe gesture including finger contacts 517 and 519, FIG. 5I)

In some embodiments, the first gesture is (812) a swipe gesture (e.g., left-swipe gesture 515, FIG. 5I).

In response to detecting the first gesture (814), in accordance with a determination that the first gesture is a single contact gesture, the device navigates (816) to a portion of the document that includes or is located proximate to a sequentially adjacent feature of the first feature type in the document (e.g., the device navigates to a next page, FIGS. 5I-5J).

In some embodiments, navigating to a portion of the document includes ceasing to display a currently displayed portion of the document and displaying the portion of the document that includes or is located proximate to a next feature of the first feature type (e.g., a next page).

In some embodiments, navigating to a portion of the document includes displaying an animated transition (e.g., scrolling, page flip, sliding, fading, etc.) between the currently displayed portion of the document and the portion of the document that includes or is located proximate to the next feature. For example, in some embodiments, the user interface 516-6 in FIG. 5I slides out to the left-side of the touch screen 112, and the user interface 516-7 in FIG. 5J slides in from the right-side of the touch screen 112.

In accordance with a determination that the first gesture is a multi-contact gesture with a first predefined number of contacts, the device navigates (818) to a portion of the document that includes or is located proximate to a sequentially adjacent feature of the second feature type in the document. For example, in response to a two contact swipe gesture including finger contacts 517 and 519 (FIG. 5I), the device navigates to a next section (e.g., from FIG. 5I to FIG. 5K). It should be understood that, in some embodiments, navigating to a portion of the document that includes or is located proximate to a sequentially adjacent feature includes navigating to a beginning of a next or previous feature (e.g., a next chapter or a previous chapter), while in other embodiments, navigating to a portion of the document that includes or is located proximate to a sequentially adjacent feature includes navigating to beginning/end of a current feature (e.g., a beginning or an end of the currently displayed section or chapter). Additionally, in some embodiments, a gesture having a first direction causes the device to navigate to a beginning of the current feature while a gesture having a second direction opposite to the first direction causes the device to navigate to a beginning of a next feature. As one example, a swipe gesture to the left causes the device to display a beginning of the next chapter, while a swipe gesture to the right causes the device to display a beginning of the current chapter.

In some embodiments, the multi-contact gesture is (820) a two contact swipe gesture (e.g., the two contact swipe gesture including finger contacts 517 and 519, FIG. 5I) and the second type of feature is a section break. For example, in response to detecting a two contact swipe gesture, the device navigates to a next or previous section.

In some embodiments, the multi-contact gesture is (822) a two contact swipe gesture and the second type of feature is a chapter break. For example, in response to detecting a two contact swipe gesture, the device navigates to a next or previous chapter.

In some embodiments, the multi-contact gesture is (824) a three contact swipe gesture and the second type of feature is an annotation. For example, in response to detecting a three contact swipe gesture, the device navigates to a portion of the electronic document that includes or corresponds to a next or previous user annotation.

In some embodiments, the first gesture has (826) a direction (e.g., the first gesture is a swipe gesture). In accordance with a determination that the direction of the gesture includes a component in a first direction (e.g., to the left), the sequentially adjacent feature is an immediately subsequent feature (e.g., a next page, section, chapter, annotation, etc.). In accordance with a determination that the direction of the gesture includes a component in a second direction (e.g., to the right) that is opposite to the first direction, the sequentially adjacent feature is an immediately preceding feature (e.g., a previous page, section, chapter, annotation, etc.). For example, in some embodiments, in response to a left-swipe gesture, the device navigates to a portion of the document that includes a next (or subsequent) feature, and in response to a right-swipe gesture, the device navigates to a portion of the document that includes a previous (or preceding) feature. In some embodiments, the device also navigates to a portion of the document that includes the previous (or preceding) feature in response to a diagonal right-up swipe or a right-down swipe, because the right-up swipe or the right-down swipe has a component in the right direction.

Figure 9:
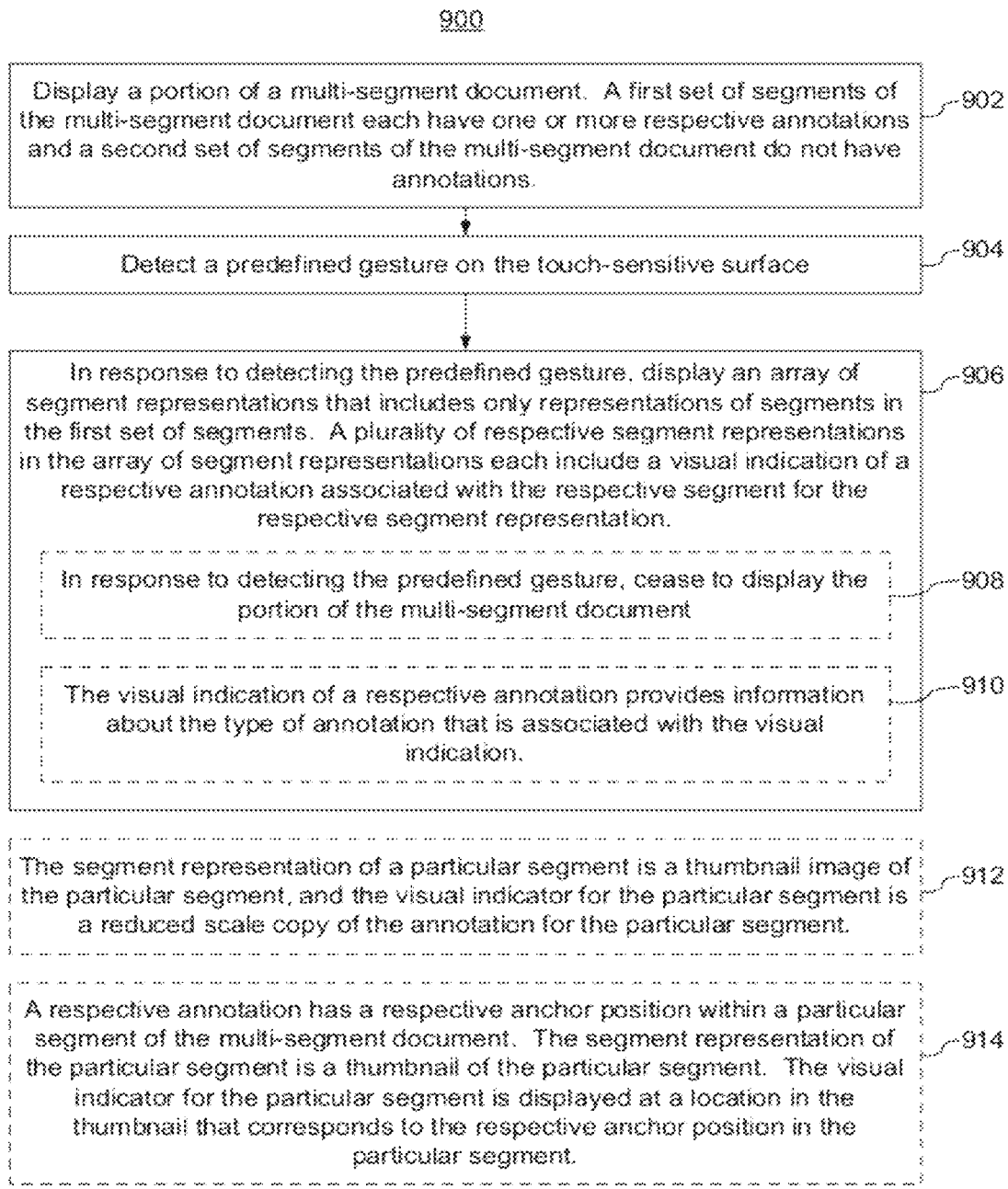
FIG. 9 is a flow diagram illustrating a method of displaying an array of annotated segment representations in accordance with some embodiments.

FIG. 9 is a flow diagram illustrating method 900 of displaying an array of annotated segment representations in accordance with some embodiments. Method 900 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, method 900 provides an intuitive way to display an overview of annotated segments of an electronic document and navigate to an annotated segment that a user wants. The method provides a display of an overview of segments that are relevant to the user (e.g., the pages that include user annotations), thereby eliminating the need for the user to go through segments that are not relevant (e.g., the pages that do not include user annotations). The method enables the user to navigate to one of the displayed segments by selecting a representation of a segment. Thus, the method streamlines the process of navigating to an annotated segment of the electronic document that the user wants, thereby creating a more efficient human-machine interface. For battery-operated electronic devices, enabling the user to navigate faster and more efficiently to an annotated segment that the user wants conserves power and increases the time between battery charges.

The device displays (902) a portion of a multi-segment document. As used herein with respect to method 900, a "segment" is a page in an electronic document, a slide in a slideshow, a worksheet in a spreadsheet, an image in an album, or the like. A first set of segments of the multi-segment document each have one or more respective annotations and a second set of segments of the multi-segment document do not have annotations. For example, the pages in user interfaces 516-1 (FIG. 5D), 516-6 (FIG. 5I), and 516-8 (FIG. 5K) have annotations (e.g., note icons 508-1, 508-2, and 508-3 and highlighting 520-1), while the page in user interface 516-7 (FIG. 5J) does not have annotations.

The device detects (904) a predefined gesture on the touch-sensitive surface. In some embodiments, the predefined gesture is: a pinch gesture, a swipe gesture, or selection of a "display annotations" button. For example, in FIG. 5K, the device detects a pinch gesture including finger contacts 523 and 525.

In response to detecting the predefined gesture, the device displays (906) an array (e.g., a multi-row, multi-column grid) of segment representations that includes only representations of segments in the first set of segments (e.g., FIG. 5L). A plurality of respective segment representations in the array of segment representations each include a visual indication of a respective annotation associated with the respective segment for the respective segment representation. For example, the thumbnail images of the annotated pages in FIG. 5L each include a visual indication of a note icon (e.g., 522-1, 522-2, and 522-4 in user interface 516-9) and/or a visual indication of highlighting (e.g., 522-3).

In some embodiments, in response to detecting the predefined gesture, the device ceases (908) to display the portion of the multi-segment document. For example, when the array of segment representations is displayed (e.g., FIG. 5L) in response to a pinch gesture on the user interface 516-8 (FIG. 5K), the user interface 516-8 ceases to display on touch screen 112.

In some embodiments, the visual indication of a respective annotation provides (910) information about the type of annotation that is associated with the visual indication. In some embodiments, the types of annotations include: bookmarks, notes, highlighting, etc. In some embodiments, when the annotation is highlighting, the visual indication is highlighting in a thumbnail of the respective segment of the multi-segment document (e.g., visual indication 522-3, FIG. 5L). In some embodiments, when the annotation is a note, the visual indication is a "note" icon (e.g., visual indication 522-1, FIG. 5L). In some embodiments, when the annotation is a bookmark, the visual indication is a bookmark icon.

In some embodiments, the segment representation (912) of a particular segment is a thumbnail image of the particular segment (e.g., FIG. 5L), and the visual indicator for the particular segment is a reduced scale copy of the annotation for the particular segment (e.g., text in the thumbnail is highlighted, a note is displayed at a location of the note in the page, etc.).

In some embodiments, a respective annotation has (914) a respective anchor position within a particular segment of the multi-segment document. The segment representation of the particular segment is a thumbnail of the particular segment (e.g., the three thumbnail representations of annotated pages shown in FIG. 5L). The visual indicator for the particular segment is displayed at a location in the thumbnail that corresponds to the respective anchor position in the particular segment. For example, a note icon 522-1 for a note that is associated with text (e.g., "central nervous system") in a page of a document is displayed in a thumbnail of the page of the document at a location in the thumbnail that corresponds to the location of the text in the page with which the note is associated.

In some embodiments, the device detects a user-selection of a respective segment representation in the array of segment representations. In response to detecting the user-selection of the respective segment representation, the device ceases to display the array of segment representations, and displays a segment of the multi-segment document that corresponds to the respective segment representation selected by the user.

Figure 10:
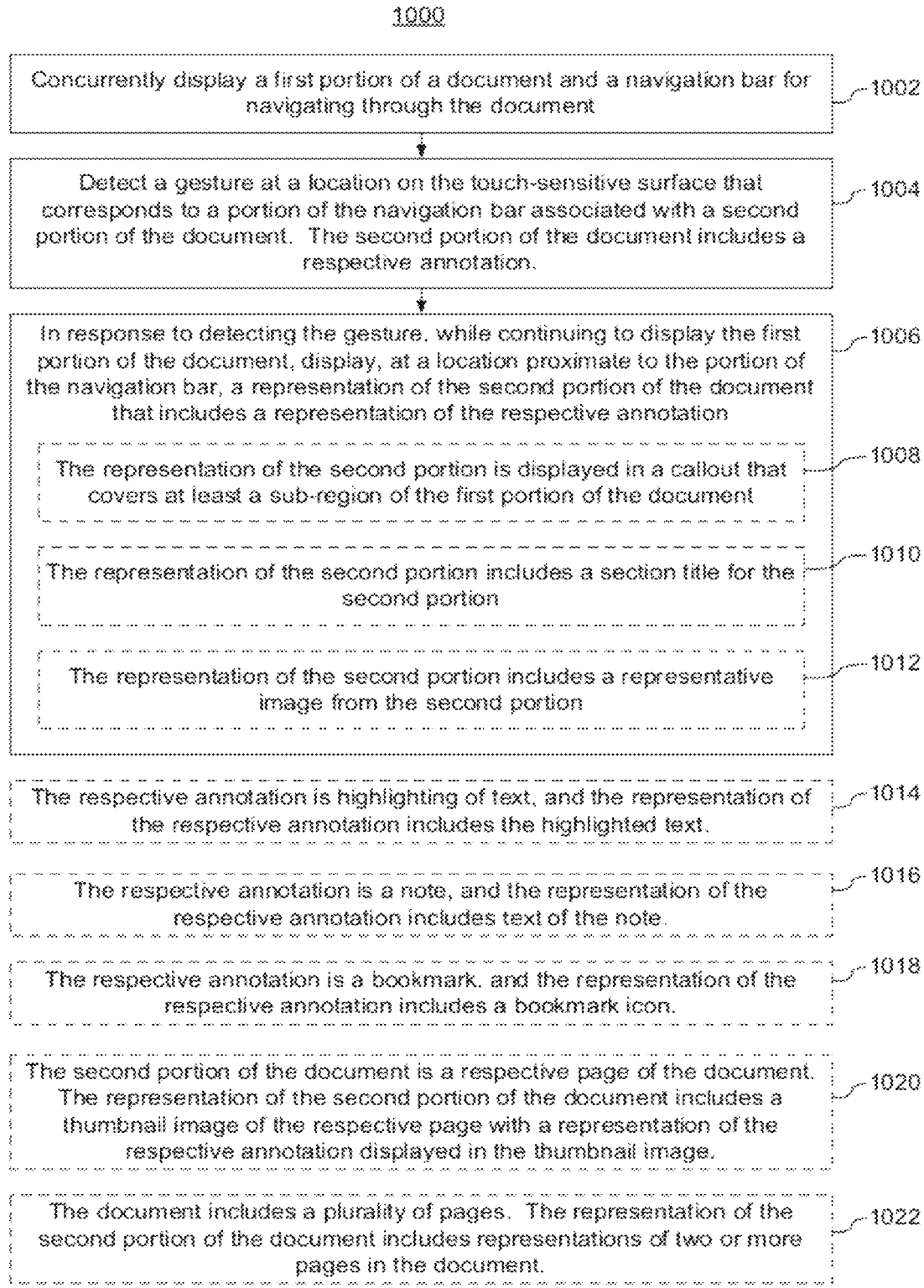
FIG. 10 is a flow diagram illustrating a method of navigating through an electronic document with a navigation bar in accordance with some embodiments.

FIG. 10 is a flow diagram illustrating method 1000 of navigating through an electronic document with a navigation bar in accordance with some embodiments. Method 1000 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, method 1000 provides an intuitive way to navigate through an electronic document with a navigation bar. The method provides a navigation that displays a preview of a portion of the electronic document that is relevant to the user (e.g., a page that includes a user annotation), thereby eliminating the need for the user to navigate to a portion that is not relevant (e.g., a page that does not include a user annotation). Thus, the method streamlines the process of navigating to an annotated portion of the electronic document that the user wants, thereby creating a more efficient human-machine interface. For battery-operated electronic devices, enabling the user to navigate faster and more efficiently to an annotated segment that the user wants conserves power and increases the time between battery charges.

The device concurrently displays (1002) a first portion of a document (e.g., a first page) and a navigation bar for navigating through the document (e.g., navigation bar 524, FIG. 5M).

The device detects (1004) a gesture at a location on the touch-sensitive surface that corresponds to a portion of the navigation bar associated with a second portion of the document (e.g., a finger contact 527, FIG. 5M). The second portion of the document includes a respective annotation.

In response to detecting the gesture, while continuing to display the first portion of the document, the device displays (1006), at a location proximate to the portion of the navigation bar, a representation of the second portion of the document that includes a representation of the respective annotation (e.g., a thumbnail image of a corresponding annotated page of the electronic document). In some embodiments, the gesture corresponds to a contact that is detected for more than a predetermined period of time (e.g., 0.02, 0.05, 0.1, 0.2 seconds or any reasonable time period) on the touch-sensitive surface.

In some embodiments, the representation of the second portion is (1008) displayed in a callout (e.g., an overlay) that covers at least a sub-region of the first portion of the document (e.g., callout 526-1, FIG. 5N). In other words, the callout is a new user interface element that is displayed in addition to the first portion of the document and the navigation bar and overlaps at least some of the first portion.

In some embodiments, the representation of the second portion includes (1010) a section title for the second portion. For example, the second portion is a page in a chapter of an electronic document and the section title for the second portion is the title of the chapter (e.g., section title 534, FIG. 5N).

In some embodiments, the representation of the second portion includes (1012) a representative image from the second portion. For example, the second portion is a page in a chapter and the representative image is a first figure in the chapter or a first figure on the page (e.g., image 530-1).

In some embodiments, the respective annotation is (1014) highlighting of text and the representation of the respective annotation includes the highlighted text (e.g., highlighted text 528-2, FIG. 5N). In some embodiments, only the highlighted text is displayed in the representation of the second portion. In some embodiments, a block of text including the highlighted text and other text is displayed in the representation of the second portion (e.g., the second portion is a page that includes a paragraph with a highlighted sentence and the representation is a callout that includes the text of the paragraph, including the highlighted text, so as to provide context for the highlighted text).

In some embodiments, the respective annotation is (1016) a note and the representation of the respective annotation includes text of the note (e.g., some or all of the text of the note is included in the representation of the second portion). For example, in FIG. 5O, the callout 526-2 includes a portion of the text of the note for the corresponding page (e.g., "the report is due . . . "). In some embodiments, the callout includes at least a portion of the text of the note without any text of the primary content (e.g., without section title 534 and any other text of the primary content).

In some embodiments, the respective annotation is (1018) a bookmark and the indication includes a bookmark icon (e.g., bookmark icon 532, FIG. 5O).

In some embodiments, the second portion of the document is (1020) a respective page of the document. The representation of the second portion of the document includes a thumbnail image (e.g., an image that includes a reduced-scale copy of the respective page) of the respective page with a representation of the respective annotation displayed in the thumbnail image (e.g., FIG. 5N). In some embodiments, the representation of the respective annotation is displayed at a location in the thumbnail that corresponds to a location of the respective annotation in the second portion of the document.

In some embodiments, the document includes (1022) a plurality of pages (e.g., FIG. 5P). The representation of the second portion of the document includes representations of two or more pages in the document. In other words, the representation of the second portion includes both a representation of a respective page that corresponds to the second portion of the document and representations of one or more consecutive pages that are sequentially adjacent to the respective page in the document.

Figure 11:
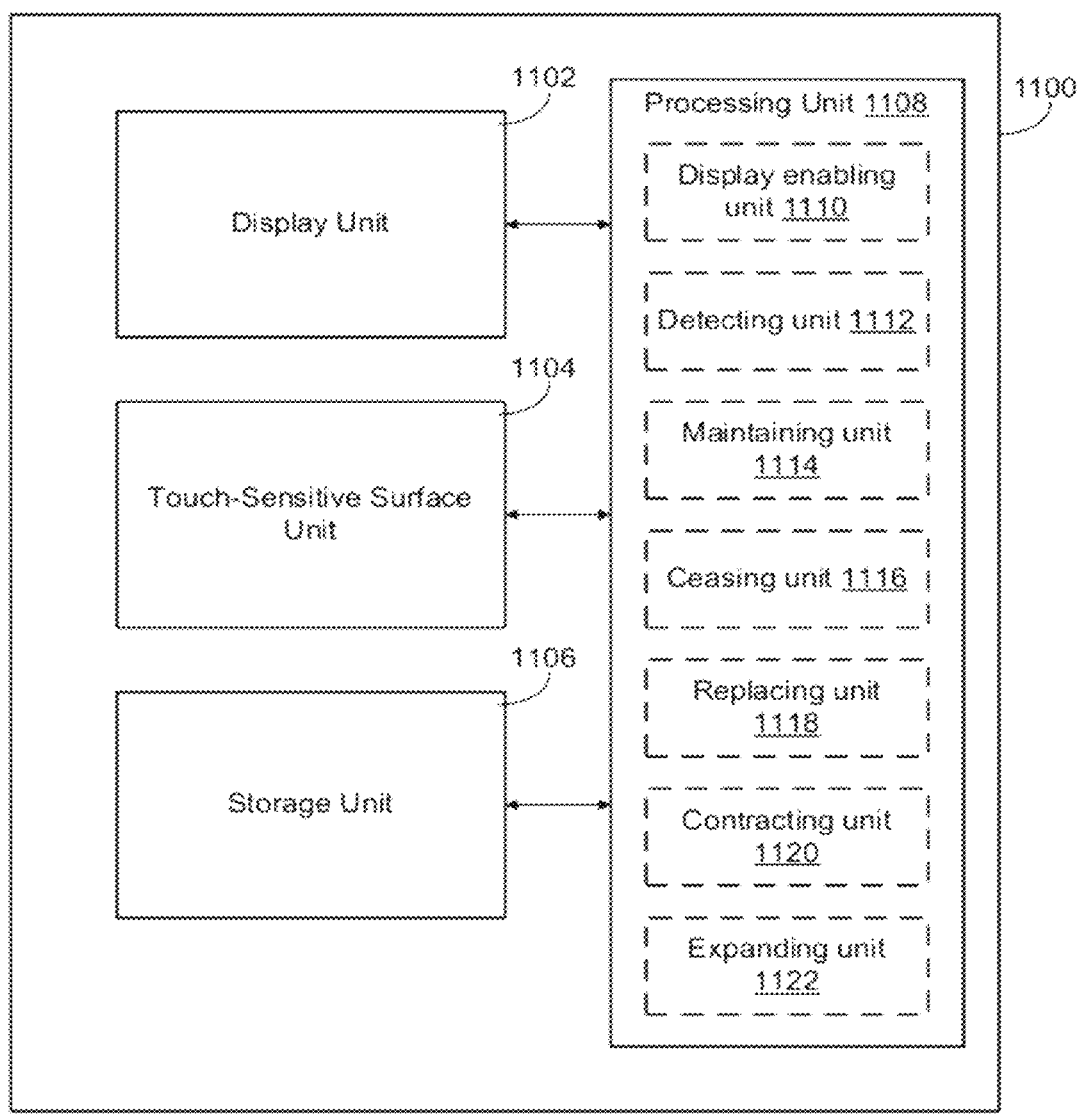
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a storage unit 1106 configured to store a document having primary content, supplementary content, and user-generated content; a display unit 1102 configured to display a representation of the document in a segmented user interface, wherein the primary content of the document is displayed in a first segment of the segmented user interface and the supplementary content of the document is concurrently displayed in a second segment of the segmented user interface distinct from the first segment; a touch-sensitive surface unit 1104 configured to receive a request to view user-generated content of the document; and a processing unit 1108 coupled to the storage unit 1106, the display unit 1102, and the touch-sensitive surface unit 1104. In some embodiments, the processing unit 1108 includes a display enabling unit 1110, a detecting unit 1112, a maintaining unit 1114, a ceasing unit 1116, a replacing unit 1118, a contracting unit 1120, and an expanding unit 1122.

The processing unit 1108 is configured to, in response to the request: maintain display of the previously displayed primary content on the display unit 1102 (e.g., with the maintaining unit 1114); cease to display at least a portion of the previously displayed supplementary content on the display unit 1102 (e.g., with the ceasing unit 1116); and enable display of user-generated content of the document in a third segment of the segmented user interface distinct from the first segment and the second segment on the display unit 1102 (e.g., with the display enabling unit 1110).

In some embodiments, the segments are dynamic regions of the user interface.

In some embodiments, at least a portion of the supplementary content is displayed concurrently with the user-generated content on the display unit 1102.

In some embodiments, the processing unit 1108 is configured to, prior to receiving the request to view user-generated content, enable display of representations of the user-generated content in the segmented user interface on the display unit 1102 (e.g., with the display enabling unit 1110).

In some embodiments, the processing unit 1108 is configured to, in response to the request to view user-generated content, replace one or more items of supplementary content with representations of the one or more items of supplementary content in the second region (e.g., with the replacing unit 1118).

In some embodiments, the processing unit 1108 is configured to: detect selection of a representation of a respective item of supplementary content (e.g., with the detecting unit 1112); and in response to detecting the selection of the representation, enable display of the respective item of supplementary content (e.g., with the display enabling unit 1110).

In some embodiments, the processing unit 1108 is configured to, in response to the request to view user-generated content, contract the second region (e.g., with the contracting unit 1120) and expand the third region (e.g., with the expanding unit 1122).

In some embodiments, receiving the request includes detecting selection of a representation of user-generated content by a user of the device (e.g., with the detecting unit 1112).

In some embodiments, one or more items of supplementary content are each associated with a respective anchor position within the primary content; and a respective item of supplementary content is displayed on the display unit 1102 at a location in the second region that is proximate to the respective anchor position for the respective item of supplementary content.

In some embodiments, one or more items of user-generated content are each associated with a respective anchor position within the primary content; and a respective item of user-generated content is displayed on the display unit 1102 at a location in the third region that is proximate to the respective anchor position for the respective item of user-generated content.

In some embodiments, the first region is displayed between the second region and the third region on the display unit 1102.

In some embodiments, the primary content consists primarily of text.

In some embodiments, the user-generated content includes annotations associated with the primary content.

In some embodiments, the user-generated content includes annotations associated with the supplementary content.

In some embodiments, ceasing to display at least a portion of the previously displayed supplementary content includes enabling display of an animated transition of the segmented user interface sliding in a predefined direction so as to slide the second segment at least partially off of the display unit 1102 (e.g., with the display enabling unit 1110).

In some embodiments, the animated transition further comprises sliding the third segment onto the display unit 1102.

In some embodiments, the sliding occurs in a direction that is perpendicular to a direction in which the content can be scrolled.

Figure 12:
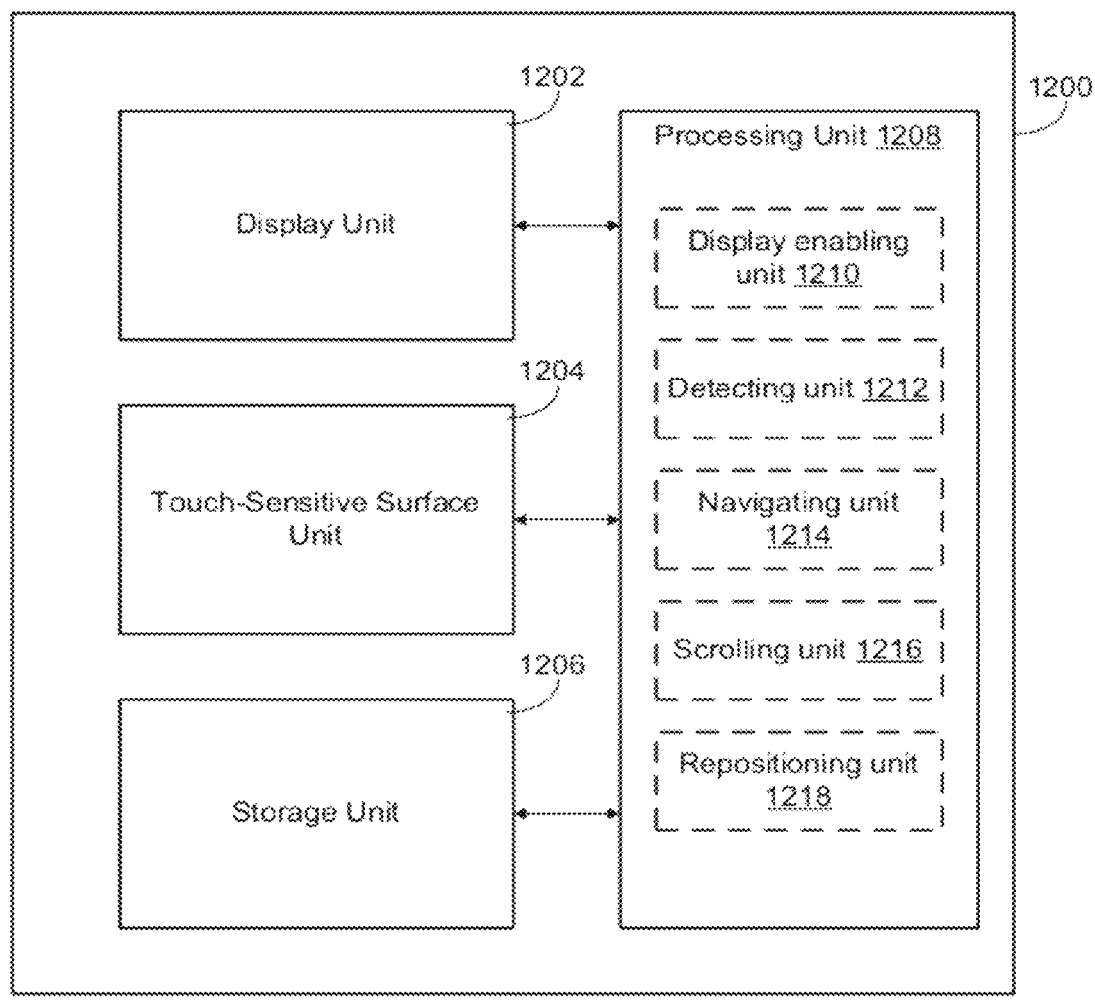
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, an electronic device 1200 includes a storage unit 1206 configured to store a document having primary content, and supplementary content; and a display unit 1202 configured to display content of the document in a first display mode of a document presentation application. The supplementary content is visually integrated with the primary content in the first display mode. The electronic device 1200 also includes a touch-sensitive surface unit 1204 configured to receive user input; and a processing unit 1208 coupled to the storage unit 1206, the display unit 1202, and the touch-sensitive surface unit 1204. In some embodiments, the processing unit 1208 includes a display enabling unit 1210, a detecting unit 1212, a navigating unit 1214, a scrolling unit 1216, and a repositioning unit 1218.

The processing unit 1208 is configured to: while the display unit 1202 displays content of the document in the first display mode, receive a request to display content of the document in a second display mode of the document presentation application; and, in response to the request, enable display of content of the document in the second display mode on the display unit (e.g., with the display enabling unit 1210). The representations of the supplementary content are visually segregated from the primary content in the second display mode.

In some embodiments, the first display mode and the second display mode are both display modes for use by an end user to view the document on the display unit 1202.

In some embodiments, visually integrating the supplementary content with the primary content in the first display mode includes enabling display of the supplementary content inline with the primary content on the display unit 1202 (e.g., with the display enabling unit 1210).

In some embodiments, visually segregating the representations of the supplementary content from the primary content in the second display mode includes: enabling display of the primary content in a first region of a user interface on the display unit 1202 that does not include the supplementary content (e.g., with the display enabling unit 1210); and enabling display of the representations of the supplementary content in a second region of the user interface on the display unit 1202 that is distinct from the first region of the user interface and that does not include the primary content (e.g., with the display enabling unit 1210).

In some embodiments, a plurality of items of supplementary content are concurrently displayed on the display unit 1202 in the first display mode.

In some embodiments, the first display mode is a creator-specified display mode in which the primary content and supplementary content are arranged in accordance with a template specified by a creator of the document.

In some embodiments, the second display mode is a text-review display mode in which two or more portions of text in the primary content that are displayed as distinct blocks of text in the creator-specified display mode are displayed in a same contiguous block of text on the display unit 1202.

In some embodiments, an item of supplementary content is displayed at a first size on the display unit 1202 in the first display mode; and a representation of the item of supplementary content is displayed in the second display mode. The representation of the item of supplementary content has a second size on the display unit 1202 that is smaller than the first size.

In some embodiments, in the first display mode, the supplementary content includes one or more items of supplementary content; and the processing unit 1208 is configured to, in the second display mode: enable display of one or more supplementary content icons on the display unit 1202 that replace corresponding items of supplementary content displayed in the first display mode (e.g., with the display enabling unit 1210); detect selection of a respective supplementary content icon (e.g., with the detecting unit 1212); and in response to detecting the selection, enable display of a corresponding item of supplementary content on the display unit 1202 (e.g., with the display enabling unit 1210).

In some embodiments, the first display mode has a first content advancement direction with respect to a reading direction of text in the primary content; and the second display mode has a second content advancement direction with respect to the reading direction of the text in the primary content that is distinct from the first content advancement direction.

In some embodiments, the primary content includes a plurality of page boundaries, and the processing unit 1208 is configured to: detect a request to navigate through the document (e.g., with the detecting unit 1212); and in response to detecting the request to navigate through the document: in accordance with a determination that the device is in the first display mode, navigate to a sequentially adjacent page in accordance with the page boundaries (e.g., with the navigating unit 1214); and in accordance with a determination that the device is in the second display mode, enable scrolling through the document in accordance with a magnitude of a value associated with the request (e.g., with the scrolling unit 1216).

In some embodiments, a respective item of supplementary content is associated with a predefined portion of the primary content; the respective item of supplementary content is displayed on the display unit 1202 proximate to the predefined portion of primary content in the first display mode; and a representation of the respective item of supplementary content is displayed on the display unit 1202 proximate to the predefined portion of primary content in the second display mode.

In some embodiments, the processing unit 1208 is configured to, while enabling display of the predefined portion of the primary content and the representation of the respective item of supplementary content in the second display mode: detect a request to navigate through the primary content (e.g., with the detecting unit 1212); and in response to detecting the request to navigate through the primary content: reposition the predefined portion of the primary content to an updated location on the display unit 1202 in accordance with the request to navigate through the primary content (e.g., with the repositioning unit 1218); and reposition the representation of the respective item of supplementary content on the display unit 1202 in accordance with the updated location of the predefined portion of the primary content (e.g., with the repositioning unit 1218).

In some embodiments, the display unit 1202 has a long axis and a short axis. In the first display mode, a reading direction of the text is aligned with the long axis. In the second display mode, the reading direction of the text is aligned with the short axis.

In some embodiments, receiving the request to display content of the document in the second display mode includes detecting rotation of the device (e.g., with the detecting unit 1212).

Figure 13:
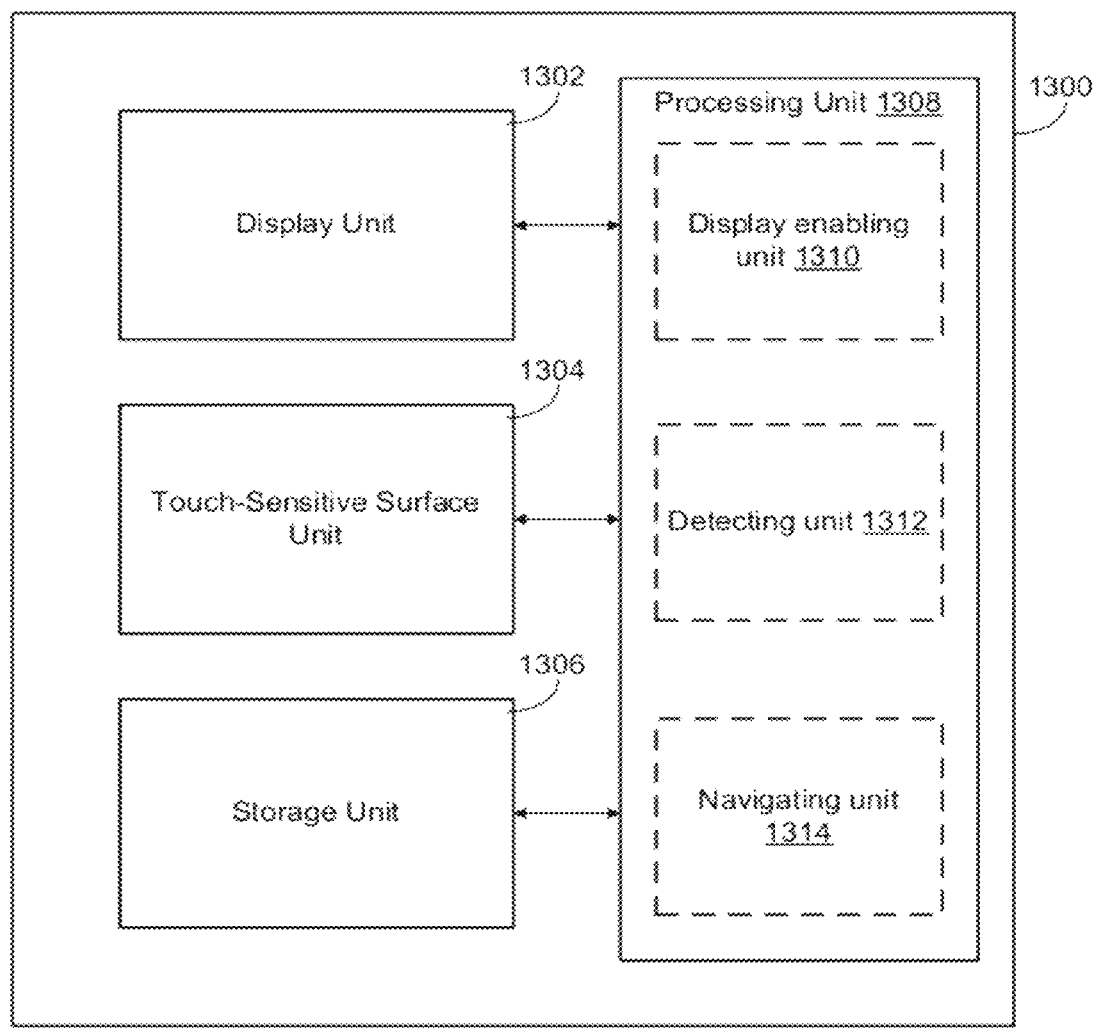
FIG. 13 is a functional block diagram of an electronic device in accordance with some embodiments.

In accordance with some embodiments, FIG. 13 shows a functional block diagram of an electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, an electronic device 1300 includes a storage unit 1306 configured to store a document having a plurality of features having respective locations within the document. The plurality of features includes features of a first feature type in a first sequence and features of a second feature type in a second sequence. The second feature type is distinct from the first feature type. The electronic device 1300 also includes a display unit 1302 configured to display at least a portion of the document; a touch-sensitive surface unit 1304 configured to detect a first gesture; and a processing unit 1308 coupled to the storage unit 1306, the display unit 1302, and the touch-sensitive surface unit 1304. In some embodiments, the processing unit 1308 includes a display enabling unit 1310, a detecting unit 1312, and a navigating unit 1314.

The processing unit 1308 is configured to, in response to detecting the first gesture (e.g., with the detecting unit 1312): in accordance with a determination that the first gesture is a single contact gesture, navigate to a portion of the document that includes or is located proximate to a sequentially adjacent feature of the first feature type in the document (e.g., with the navigating unit 1314); and in accordance with a determination that the first gesture is a multi-contact gesture with a first predefined number of contacts, navigate to a portion of the document that includes or is located proximate to a sequentially adjacent feature of the second feature type in the document (e.g., with the navigating unit 1314).

In some embodiments, the first feature type is a page or a page break.

In some embodiments, the second feature type is one of: a section, a section break, a chapter, a chapter break or an annotation.

In some embodiments, the first gesture is a swipe gesture.

In some embodiments, the multi-contact gesture is a two contact swipe gesture and the second type of feature is a section break.

In some embodiments, the multi-contact gesture is a two contact swipe gesture and the second type of feature is a chapter break.

In some embodiments, the multi-contact gesture is a three contact swipe gesture and the second type of feature is an annotation.

In some embodiments, the first gesture has a direction. In accordance with a determination that the direction of the gesture includes a component in a first direction, the sequentially adjacent feature is an immediately subsequent feature. In accordance with a determination that the direction of the gesture includes a component in a second direction that is opposite to the first direction, the sequentially adjacent feature is an immediately preceding feature.

Figure 14:
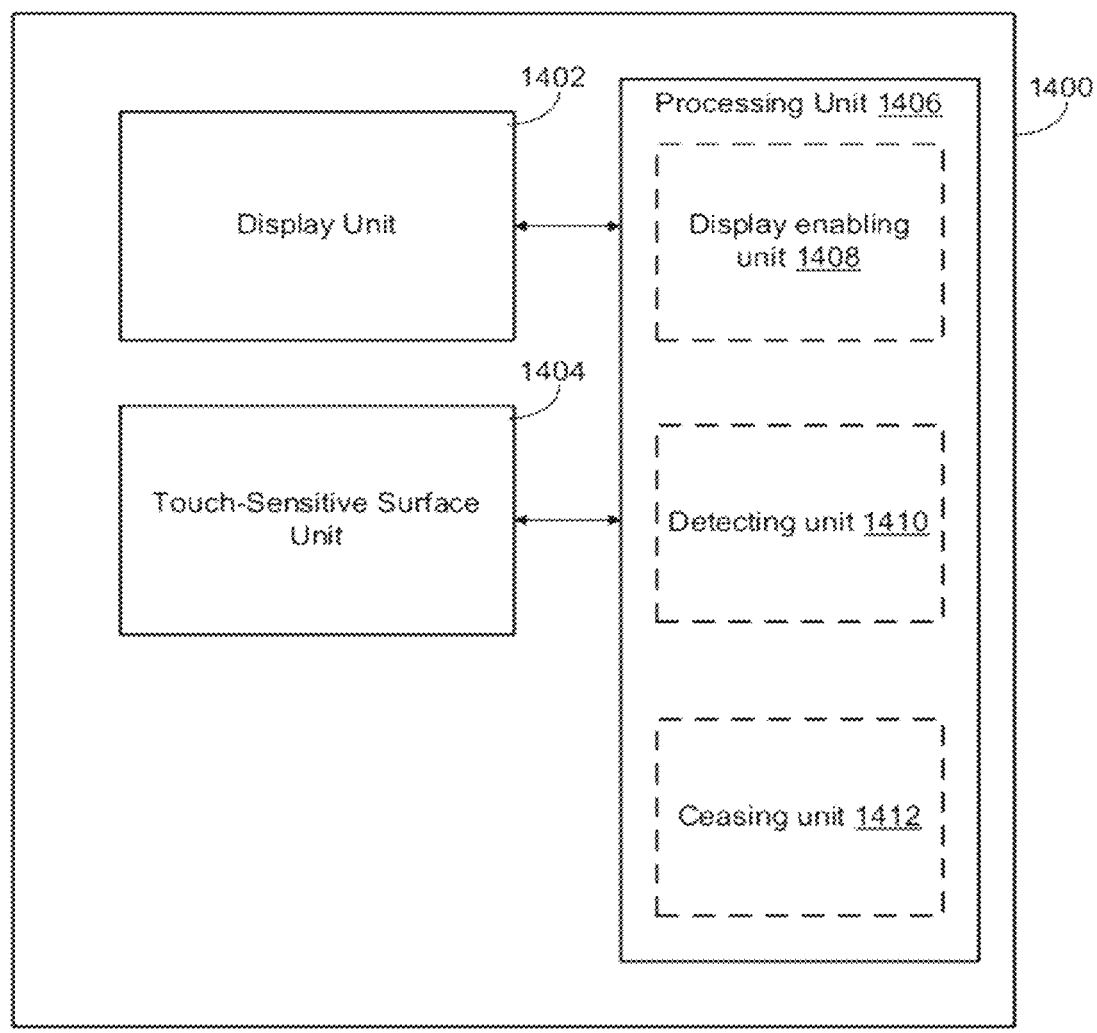
FIG. 14 is a functional block diagram of an electronic device in accordance with some embodiments.

In accordance with some embodiments, FIG. 14 shows a functional block diagram of an electronic device 1400 configured in accordance with the principles of the invention as described above. The functional blocks of the device may be implemented by hardware, software, or a combination of hardware and software to carry out the principles of the invention. It is understood by persons of skill in the art that the functional blocks described in FIG. 14 may be combined or separated into sub-blocks to implement the principles of the invention as described above. Therefore, the description herein may support any possible combination or separation or further definition of the functional blocks described herein.

As shown in FIG. 14, an electronic device 1400 includes a display unit 1402 configured to display a portion of a multi-segment document. A first set of segments of the multi-segment document each have one or more respective annotations and a second set of segments of the multi-segment document do not have annotations. The electronic device 1400 also includes a touch-sensitive surface unit 1404 configured to detect a predefined gesture; and a processing unit 1408 coupled to the display unit 1402 and the touch-sensitive surface unit 1404. In some embodiments, the processing unit 1406 includes a display enabling unit 1408, a detecting unit 1410, and a ceasing unit 1412.

The processing unit 1406 is configured to, in response to detecting the predefined gesture (e.g., with the detecting unit 1410), enable display of an array of segment representations that includes only representations of segments in the first set of segments (e.g., with the display enabling unit 1408). A plurality of respective segment representations in the array of segment representations each include a visual indication of a respective annotation associated with the respective segment for the respective segment representation.

In some embodiments, the processing unit 1406 is configured to, in response to detecting the predefined gesture (e.g., with the detecting unit 1410), cease to display the portion of the multi-segment document on the display unit 1402 (e.g., with the ceasing unit 1412).

In some embodiments, a visual indication of a respective annotation provides information about the type of annotation that is associated with the visual indication.

In some embodiments, the segment representation of a particular segment is a thumbnail image of the particular segment; and the visual indicator for the particular segment is a reduced scale copy of the annotation for the particular segment.

In some embodiments, a respective annotation has a respective anchor position within a particular segment of the multi-segment document. The segment representation of the particular segment is a thumbnail of the particular segment. The visual indicator for the particular segment is displayed at a location in the thumbnail that corresponds to the respective anchor position in the particular segment.

Figure 15:
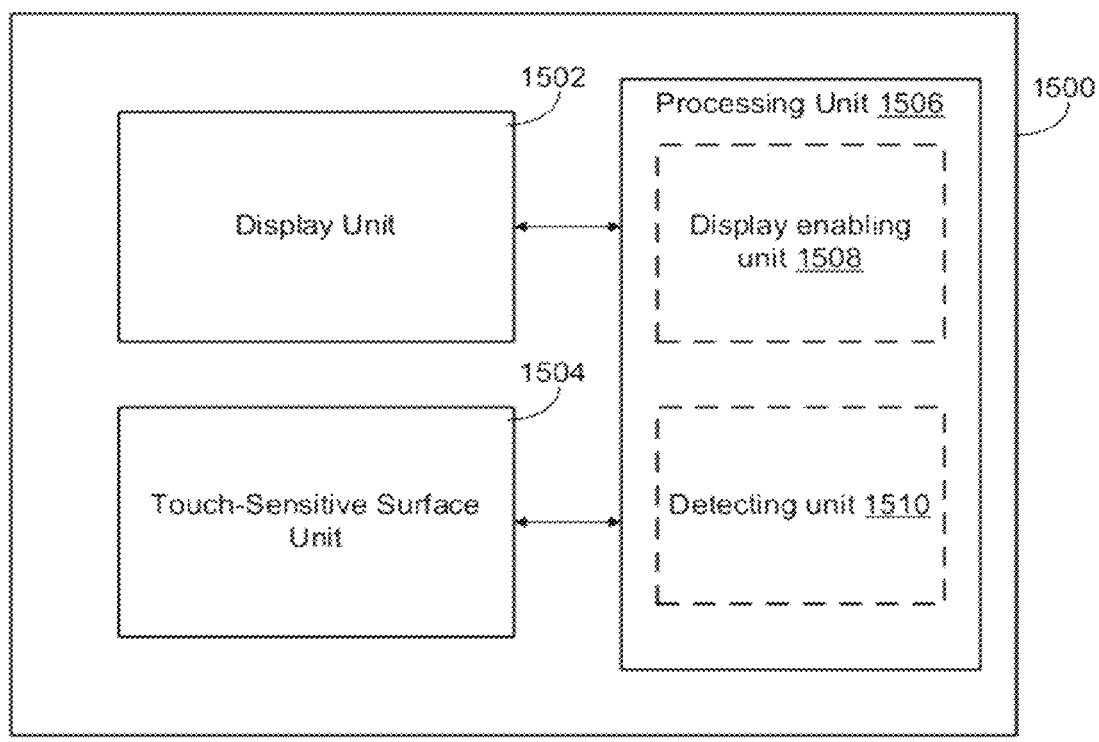
FIG. 15 is a functional block diagram of an electronic device in accordance with some embodiments.

In accordance with some embodiments, FIG. 15 shows a functional block diagram of an electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, an electronic device 1500 includes a display unit 1502 configured to concurrently display a first portion of a document and a navigation bar for navigating through the document; and a touch-sensitive surface unit 1504 configured to detect a gesture at a location on the touch-sensitive surface unit 1504 that corresponds to a portion of the navigation bar associated with a second portion of the document. The second portion of the document includes a respective annotation. The electronic device 1500 also includes a processing unit 1506 coupled to the display unit 1502 and the touch-sensitive surface unit 1504. In some embodiments, the processing unit 1506 includes a display enabling unit 1508, and a detecting unit 1510.

The processing unit 1506 is configured to, in response to detecting the gesture (e.g., with the detecting unit 1510), while continuing to enable display of the first portion of the document on the display unit 1502 (e.g., with the display enabling unit 1508), enable display, at a location proximate to the portion of the navigation bar, on the display unit 1502 of a representation of the second portion of the document that includes a representation of the respective annotation (e.g., with the display enabling unit 1508).

In some embodiments, the representation of the second portion is displayed on the display unit 1502 in a callout that covers at least a sub-region of the first portion of the document.

In some embodiments, the representation of the second portion includes a section title for the second portion.

In some embodiments, the representation of the second portion includes a representative image.

In some embodiments, the respective annotation is highlighting of text and the representation of the respective annotation includes the highlighted text.

In some embodiments, the respective annotation is a note and the representation of the respective annotation includes text of the note.

In some embodiments, the respective annotation is a bookmark and the representation of the respective annotation includes a bookmark icon.

In some embodiments, the second portion of the document is a respective page of the document; and the representation of the second portion of the document includes a thumbnail image of the respective page with a representation of the respective annotation displayed in the thumbnail image on the display unit 1502.

In some embodiments, the document includes a plurality of pages; and the representation of the second portion of the document includes representations of two or more pages in the document.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

Figure 1B:
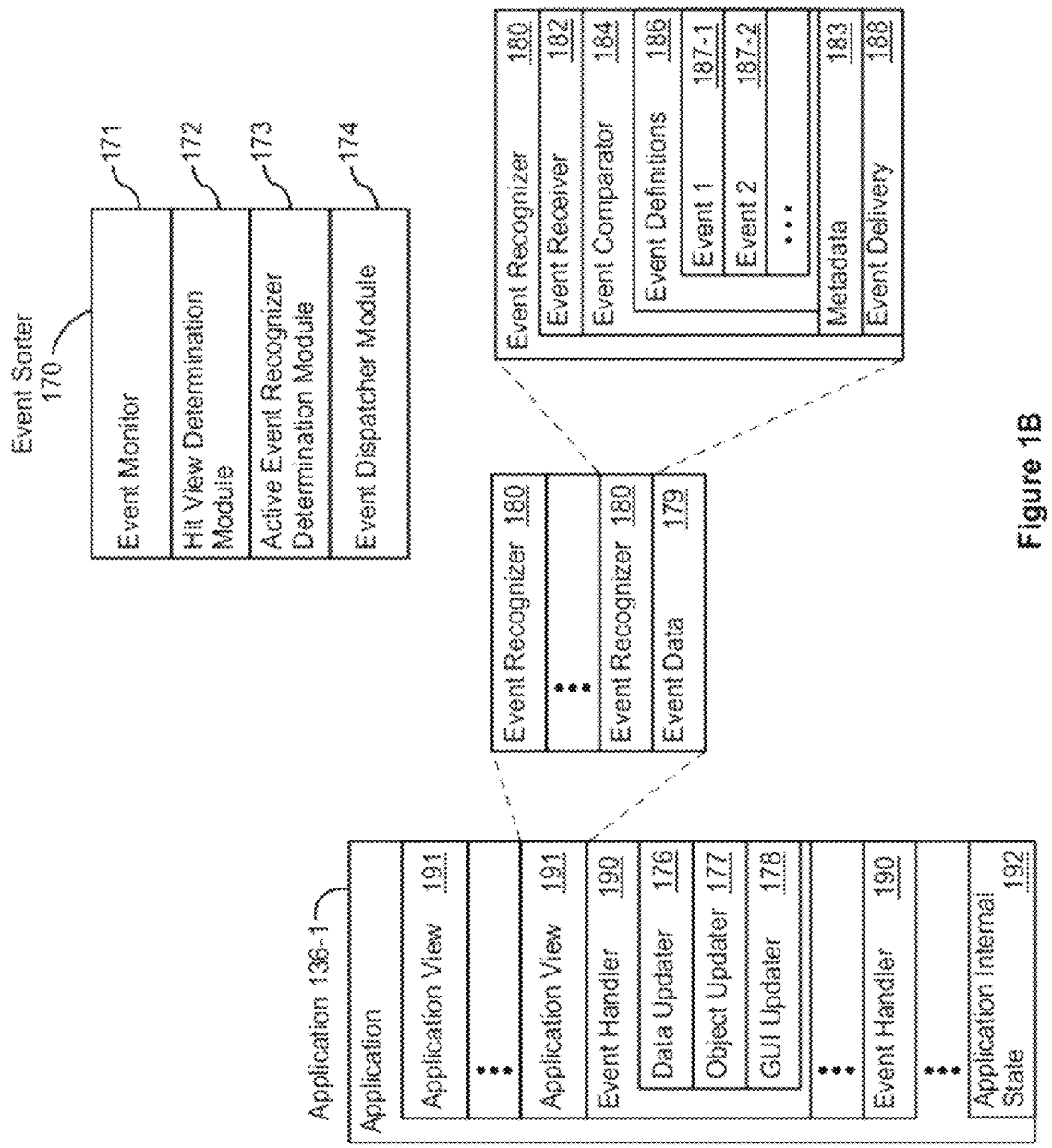
FIG. 1B is a block diagram illustrating exemplary components for event handling in accordance with some embodiments.

The operations described above with reference to FIGS. 6A-6C, 7A-7C, 8, 9, and 10 may be implemented by components depicted in FIGS. 1A-1B. For example, receive operation 618, display operation 634, and detect and display operations 638 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
a display;
a touch-sensitive surface;
one or more processors;
memory; and one or more programs, wherein the one or more programs are stored in the memory and configured to be executed by the one or more processors, the one or more programs including instructions for:
storing a document having primary content, supplementary content, and user-generated content;

displaying a representation of the document in a segmented user interface on the display, wherein:
the primary content of the document is displayed in a first segment of the segmented user interface,
the supplementary content of the document is concurrently displayed in a second segment of the segmented user interface distinct from the first segment,
the primary content and secondary content are concurrently displayed with a graphical representation of respective user-generated content in the segmented user interface, and
the segmented user interface is configured to scroll in a primary scrolling direction;
detecting selection of the graphical representation of the respective user-generated content of the document; and
in response to detecting the selection of the graphical representation of user-generated content:
displaying an animation of the primary content sliding in a predefined direction that is different from the primary scrolling direction, and is independent of movement of an input during selection of the graphical representation of user generated content, while maintaining display of the previously displayed primary content;
ceasing to display at least a portion of the previously displayed supplementary content; and
replacing display of the graphical representation of the respective user-generated content with displaying the respective user-generated content of the document in a third segment of the segmented user interface distinct from the first segment and the second segment, wherein the first segment, the second segment, and the third segment are non-overlapping in the segmented user interface.

2. The device of claim 1, wherein the segments are dynamic regions of the user interface.

3. The device of claim 1, wherein at least a portion of the supplementary content is displayed concurrently with the user-generated content.

4. The device of claim 1, including instructions for, prior to receiving the request to view detecting the selection of the graphical representation of user-generated content, displaying representations of the user-generated content in the segmented user interface.

5. The device of claim 1, including instructions for, in response to the request to view detecting the selection of the graphical representation of user-generated content, replacing one or more items of supplementary content with representations of the one or more items of supplementary content in the second segment.

6. The device of claim 5, including instructions for:
detecting selection of a representation of a respective item of supplementary content; and
in response to detecting the selection of the representation, displaying the respective item of supplementary content.

7. The device of claim 1, including instructions for, in response to the request to view detecting the selection of the graphical representation of user-generated content, contracting the second segment and expanding the third segment.

8. The device of claim 1, wherein:
one or more items of supplementary content are each associated with a respective anchor position within the primary content; and
a respective item of supplementary content is displayed at a location in the second segment that is proximate to the respective anchor position for the respective item of supplementary content.

9. The device of claim 1, wherein:
one or more items of user-generated content are each associated with a respective anchor position within the primary content; and
a respective item of user-generated content is displayed at a location in the third segment that is proximate to the respective anchor position for the respective item of user-generated content.

10. The device of claim 1, wherein the first segment is displayed between the second segment and the third segment on the display.

11. The device of claim 1, wherein the primary content consists primarily of text.

12. The device of claim 1, wherein the user-generated content includes annotations associated with the primary content.

13. The device of claim 1, wherein the user-generated content includes annotations associated with the supplementary content.

14. The device of claim 1, wherein ceasing to display at least a portion of the previously displayed supplementary content includes displaying an animated transition of the segmented user interface sliding in a predefined direction so as to slide the second segment at least partially off of the display.

15. The device of claim 14, wherein the animated transition further comprises sliding the third segment onto the display.

16. The device of claim 14, wherein the sliding occurs in a direction that is perpendicular to a scrolling direction of the primary content.

17. A method, comprising:
at portable electronic device having a display and a touch-sensitive surface:
storing a document having primary content, supplementary content, and user-generated content;
displaying a representation of the document in a segmented user interface on the display, wherein:
the primary content of the document is displayed in a first segment of the segmented user interface,
the supplementary content of the document is concurrently displayed in a second segment of the segmented user interface distinct from the first segment,
the primary content and secondary content are concurrently displayed with a graphical representation of respective user-generated content in the segmented user interface, and
the segmented user interface is configured to scroll in a primary scrolling direction;
detecting selection of the graphical representation of the respective user-generated content of the document; and
in response to detecting the selection of the graphical representation of user-generated content:
displaying an animation of the primary content sliding in a predefined direction that is different from the primary scrolling direction, and is independent of movement of an input during selection of the graphical representation of user generated content, while maintaining display of the previously displayed primary content;

ceasing to display at least a portion of the previously displayed supplementary content; and replacing display of the graphical representation of the respective user-generated content with displaying the respective user-generated content of the document in a third segment of the segmented user interface distinct from the first segment and the second segment, wherein the first segment, the second segment, and the third segment are non-overlapping in the segmented user interface.

18. A non-transitory computer readable storage medium storing one or more programs, the one or more programs comprising instructions, which, when executed by a portable electronic device with a display and a touch-sensitive surface, cause the device to:

store a document having primary content, supplementary content, and user-generated content;

display a representation of the document in a segmented user interface on the display, wherein:

the primary content of the document is displayed in a first segment of the segmented user interface, the supplementary content of the document is concurrently displayed in a second segment of the segmented user interface distinct from the first segment, the primary content and secondary content are concurrently displayed with a graphical representation of respective user-generated content in the segmented user interface, and the segmented user interface is configured to scroll in a primary scrolling direction;

detect selection of the graphical representation of the respective user-generated content of the document; and in response to detecting the selection of the graphical representation of user-generated content:

display an animation of the primary content sliding in a predefined direction that is different from the primary scrolling direction, and is independent of movement of an input during selection of the graphical representation of user generated content, while maintaining display of the previously displayed primary content;

cease to display at least a portion of the previously displayed supplementary content; and replace display of the graphical representation of the respective user-generated content with display of the respective user-generated content of the document in a third segment of the segmented user interface distinct from the first segment and the second segment, wherein the first segment, the second segment, and the third segment are non-overlapping in the segmented user interface.

19. The device of claim 1, wherein the first segment, the second segment, and the third segment are distinct columns in the segmented user interface.

20. The method of claim 17, wherein the first segment, the second segment, and the third segment are distinct columns in the segmented user interface.

21. The computer readable storage medium of claim 18, wherein the first segment, the second segment, and the third segment are distinct columns in the segmented user interface.

22. The method of claim 17, wherein the segments are dynamic regions of the user interface.

23. The method of claim 17, wherein at least a portion of the supplementary content is displayed concurrently with the user-generated content.

24. The method of claim 17, including, prior to detecting the selection of the graphical representation of user-generated content, displaying representations of the user-generated content in the segmented user interface.

25. The method of claim 17, including, in response to detecting the selection of the graphical representation of user-generated content, replacing one or more items of supplementary content with representations of the one or more items of supplementary content in the second segment.

26. The method of claim 25, including:

detecting selection of a representation of a respective item of supplementary content; and in response to detecting the selection of the representation, displaying the respective item of supplementary content.

27. The method of claim 17, including, in response to detecting the selection of the graphical representation of user-generated content, contracting the second segment and expanding the third segment.

28. The method of claim 17, wherein:

one or more items of supplementary content are each associated with a respective anchor position within the primary content; and a respective item of supplementary content is displayed at a location in the second segment that is proximate to the respective anchor position for the respective item of supplementary content.

29. The method of claim 17, wherein:

one or more items of user-generated content are each associated with a respective anchor position within the primary content; and a respective item of user-generated content is displayed at a location in the third segment that is proximate to the respective anchor position for the respective item of user-generated content.

30. The method of claim 17, wherein the first segment is displayed between the second segment and the third segment on the display.

31. The method of claim 17, wherein the primary content consists primarily of text.

32. The method of claim 17, wherein the user-generated content includes annotations associated with the primary content.

33. The method of claim 17, wherein the user-generated content includes annotations associated with the supplementary content.

34. The method of claim 17, wherein ceasing to display at least a portion of the previously displayed supplementary content includes displaying an animated transition of the segmented user interface sliding in a predefined direction so as to slide the second segment at least partially off of the display.

35. The method of claim 34, wherein the animated transition further comprises sliding the third segment onto the display.

36. The method of claim 34, wherein the sliding occurs in a direction that is perpendicular to a scrolling direction of the primary content.

37. The computer readable storage medium of claim 18, wherein the segments are dynamic regions of the user interface.

38. The computer readable storage medium of claim 18, wherein at least a portion of the supplementary content is displayed concurrently with the user-generated content.

39. The computer readable storage medium of claim 18, including instructions that cause the device to, prior to detecting the selection of the graphical representation of user-generated content, display representations of the user-generated content in the segmented user interface.

40. The computer readable storage medium of claim 18, including instructions that cause the device to, in response to detecting the selection of the graphical representation of user-generated content, replace one or more items of supplementary content with representations of the one or more items of supplementary content in the second segment.

41. The computer readable storage medium of claim 40, including instructions that cause the device to:
   detect selection of a representation of a respective item of supplementary content; and
   in response to detecting the selection of the representation, display the respective item of supplementary content.

42. The computer readable storage medium of claim 18, including instructions that cause the device to, in response to detecting the selection of the graphical representation of user-generated content, contract the second segment and expanding the third segment.

43. The computer readable storage medium of claim 18, wherein:
   one or more items of supplementary content are each associated with a respective anchor position within the primary content; and
   a respective item of supplementary content is displayed at a location in the second segment that is proximate to the respective anchor position for the respective item of supplementary content.

44. The computer readable storage medium of claim 18, wherein:
   one or more items of user-generated content are each associated with a respective anchor position within the primary content; and
   a respective item of user-generated content is displayed at a location in the third segment that is proximate to the respective anchor position for the respective item of user-generated content.

45. The computer readable storage medium of claim 18, wherein the first segment is displayed between the second segment and the third segment on the display.

46. The computer readable storage medium of claim 18, wherein the primary content consists primarily of text.

47. The computer readable storage medium of claim 18, wherein the user-generated content includes annotations associated with the primary content.

48. The computer readable storage medium of claim 18, wherein the user-generated content includes annotations associated with the supplementary content.

49. The computer readable storage medium of claim 18, wherein ceasing to display at least a portion of the previously displayed supplementary content includes displaying an animated transition of the segmented user interface sliding in a predefined direction so as to slide the second segment at least partially off of the display.

50. The computer readable storage medium of claim 49, wherein the animated transition further comprises sliding the third segment onto the display.

51. The computer readable storage medium of claim 49, wherein the sliding occurs in a direction that is perpendicular to a scrolling direction of the primary content.

* * * * *